(12) United States Patent
Greer et al.

(10) Patent No.: US 11,397,360 B2
(45) Date of Patent: Jul. 26, 2022

(54) APPARATUS FOR OPERATING A NON-LIGHT-EMITTING VARIABLE TRANSMISSION DEVICE AND A METHOD OF USING THE SAME

(71) Applicant: SAGE ELECTROCHROMICS, INC., Faribault, MN (US)

(72) Inventors: Bryan D. Greer, Northfield, MN (US); Anna Brown, Northfield, MN (US); Yigang Wang, Maple Grove, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 130 days.

(21) Appl. No.: 16/101,914

(22) Filed: Aug. 13, 2018

(65) Prior Publication Data
US 2019/0072832 A1 Mar. 7, 2019

Related U.S. Application Data

(60) Provisional application No. 62/545,246, filed on Aug. 14, 2017.

(51) Int. Cl.
*G02F 1/163* (2006.01)
(52) U.S. Cl.
CPC ..................... *G02F 1/163* (2013.01)
(58) Field of Classification Search
CPC ........................................... G02F 1/163
See application file for complete search history.

(56) References Cited

U.S. PATENT DOCUMENTS

| | | | |
|---|---|---|---|
| 7,277,215 B2 | 10/2007 | Greer | |
| 9,030,725 B2 | 5/2015 | Pradhan et al. | |
| 9,081,247 B1 | 7/2015 | Pradhan et al. | |
| 9,477,131 B2 | 10/2016 | Pradhan et al. | |
| 9,588,358 B2 | 3/2017 | Branda et al. | |
| 2006/0245024 A1 | 11/2006 | Greer | |

(Continued)

OTHER PUBLICATIONS

International Search Report and Written Opinion for PCT/US2018/046452, dated Dec. 3, 2018, 16 pages.

*Primary Examiner* — Wen Huang
(74) *Attorney, Agent, or Firm* — Abel Schillinger, LLP; Robert N Young

(57) ABSTRACT

A method can be used to control the operation of one or more non-light-emitting, variable transmission devices. In an embodiment, a method of operating a plurality of non-light-emitting, variable transmission devices can include receiving requests for requested visible transmittance for the non-light-emitting, variable transmission devices; determining operating parameters for the non-light-emitting, variable transmission devices; and operating the non-light-emitting, variable transmission devices at the operating parameters, wherein the operating parameters for the non-light-emitting, variable transmission devices are different. In another aspect, the method can include operating the non-light-emitting, variable transmission device at a first operating parameter for a time period, wherein the operating parameter corresponds to an intermediate visible transmittance; generating a characterization parameter based at least part on the voltage and current measurements that are obtained during the time period; and controlling the non-light-emitting, variable transmission device period based at least in part on the characterization parameter.

18 Claims, 9 Drawing Sheets

(56) References Cited

U.S. PATENT DOCUMENTS

2015/0092259 A1 4/2015 Greer et al.
2015/0109653 A1 4/2015 Greer et al.
2016/0377949 A1 12/2016 Jack et al.
2017/0097553 A1 4/2017 Jack et al.

APPARATUS FOR OPERATING A NON-LIGHT-EMITTING VARIABLE TRANSMISSION DEVICE AND A METHOD OF USING THE SAME

CROSS-REFERENCE TO RELATED APPLICATION

This Application claims priority under 35 U.S.C. § 119(e) to U.S. Provisional Application No. 62/545,246, entitled "APPARATUS FOR OPERATING A NON-LIGHT-EMITTING VARIABLE TRANSMISSION DEVICE AND A METHOD OF USING THE SAME," by Bryan D. Greer at al., filed Aug. 14, 2017, which is assigned to the current assignee hereof and is incorporated herein by reference in its entirety.

FIELD OF THE DISCLOSURE

The present disclosure is directed to apparatuses that operate non-light-emitting variable transmission devices, and methods of using the same.

BACKGROUND

A non-light-emitting variable transmission device can reduce glare and the amount of sunlight entering a room. Many non-light-emitting variable transmission devices that may be located along a wall of a building or a room or within a skylight. Also, a glazing may include a glass substrate with different zones each having a non-light-emitting variable transmission device. Sometimes, all non-light-emitting variable transmission devices along a wall, within a skylight or within a glazing may be set to the same visible transmittance. Typically, the same voltage will be applied to all non-light-emitting variable transmission devices. The actual visible transmittance may not be sufficiently uniform and can be seen by a human with average eyesight. Further improvement in control of non-light-emitting variable transmission devices is desired.

BRIEF DESCRIPTION OF THE DRAWINGS

Embodiments are illustrated by way of example and are not limited in the accompanying figures.

Figure 1:
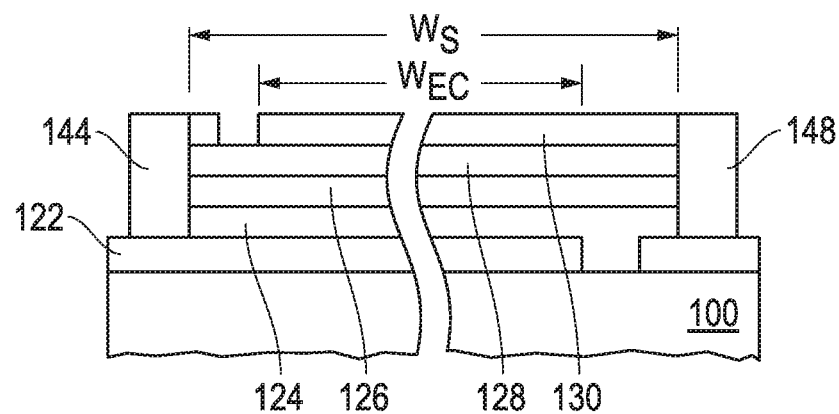
FIG. 1 includes an illustration of a cross-sectional view of a portion of glazing including a non-light-emitting, variable transmission device.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "detected by a human having average eyesight" is intended to mean that a feature being detected can be seen by a human, without a visual aid other than eyeglasses, whose vision with respect to color is at the $50^{th}$ percentile or higher.

The terms "normal operation" and "normal operating state" refer to conditions under which an electrical component or device is designed to operate. The conditions may be obtained from a data sheet or other information regarding voltages, currents, capacitances, resistances, or other electrical parameters. Thus, normal operation does not include operating an electrical component or device well beyond its design limits.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A method can be used to control the operation of one or more non-light-emitting, variable transmission devices. In an embodiment, a method of operating a plurality of non-light-emitting, variable transmission devices can include receiving requests for requested visible transmittance for the non-light-emitting, variable transmission devices; determining operating parameters for the non-light-emitting, variable transmission devices, wherein the operating parameters are determined at least in part on characterization data for the non-light-emitting, variable transmission devices; and operating the non-light-emitting, variable transmission devices at the operating parameters, wherein the operating parameters for the non-light-emitting, variable transmission devices are different. In a particular embodiment, the non-light-emitting, variable transmission devices can be long the same wall or within the same skylight. Better uniformity in visible transmittances can be achieved, and when different visible transmittances are desired, actual transmittances can be closer to the desired transmittances.

In another aspect, control of individual non-light-emitting, variable transmission devices can be achieved. The method can include operating the non-light-emitting, variable transmission device at a first operating parameter for a time period, wherein the operating parameter corresponds to an intermediate visible transmittance; generating a characterization parameter based at least part on the voltage and current measurements that are obtained during the time period; and controlling the non-light-emitting, variable transmission device period based at least in part on the characterization parameter. In an embodiment, the data used for generating the characterization parameter can be obtained during the normal operation of the non-light-emitting, variable transmission device. Alternatively, the characterization parameter may be initially generated during a separate calibration or characterization operation at a fabrication or testing facility or after its final installation and regular use. The initial data can be supplemented with data obtained during normal operation of the non-light-emitting, variable transmission device. In a particular embodiment, the data may be obtained when the non-light-emitting, variable transmission device is in an intermediate visible transmittance state, and exclude data when the non-light-emitting, variable transmission device is operated in its fully bleached or fully tinted state.

In the description below, a first portion describes the composition of a non-light-emitting, variable transmission device and exemplary layouts for one or more non-light-emitting devices disposed on a glass substrate, and a second portion describes a circuit that can be used to model the behavior of a non-light-emitting, variable transmission device and a method of operation the non-light-emitting variable transmission devices. A third portion describes embodiments with a plurality of non-light-emitting variable transmission devices and a method of operating such non-light-emitting variable transmission devices.

The non-light-emitting variable transmission device can be used within an apparatus. The apparatus can further include a control device that controls the non-light-emitting variable transmission device. Components within the apparatus may be located near or remotely from the non-light-emitting variable transmission device.

FIG. 1 includes a cross-sectional view of a portion of substrate 100, a stack of layers 122, 124, 126, 128, and 130, and bus bars 144 and 148 overlying the substrate 100. In an embodiment, the substrate 100 can include a glass substrate, a sapphire substrate, an aluminum oxynitride substrate, or a spinel substrate. In another embodiment, the substrate 100 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 100 may or may not be flexible. In a particular embodiment, the substrate 100 can be float glass or a borosilicate glass and have a thickness in a range of 0.5 mm to 4 mm thick. In another particular embodiment, the substrate 100 can include ultra-thin glass that is a mineral glass having a thickness in a range of 50 microns to 300 microns. In a particular embodiment, the substrate 100 may be used for many different non-light-emitting variable transmission devices being formed and may referred to as a motherboard.

The compositions and thicknesses of the layers are described before describing their formation. Transparent conductive layers 122 and 130 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 122 and 130 can include gold, silver, copper, nickel, aluminum, or any combination thereof. The transparent conductive layers 122 and 130 can have the same or different compositions.

The set of layers further includes an electrochromic stack that includes the layers 124, 126, and 128 that are disposed between the transparent conductive layers 122 and 130. The layers 124 and 128 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 80 nm to 500 nm. An ion conductive layer 126 (also referred to as an electrolyte layer) is disposed between the electrode layers 124 and 128, and has a thickness in a range of 20 microns to 60 microns. The ion conductive layer 126 allows ions to migrate therethrough and does not allow a significant number of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 126 is optional and, when present, may be formed by deposition or, after depositing the other layers, reacting portions of two different layers, such as the electrode layers 124 and 128, to form the ion conductive layer 126. After reading this specification, skilled artisans will appreciate that other compositions and thicknesses for the layers 122, 124, 126, 128, and 130 can be used without departing from the scope of the concepts described herein.

The layers 122, 124, 126, 128, and 130 can be formed over the substrate 100 with or without any intervening patterning steps, breaking vacuum, or exposing an intermediate layer to air before all the layers are formed. In an embodiment, the layers 122, 124, 126, 128, and 130 can be serially deposited. The layers 122, 124, 126, 128, and 130 may be formed using physical vapor deposition or chemical vapor deposition. In a particular embodiment, the layers 122, 124, 126, 128, and 130 are sputter deposited.

In the embodiment illustrated in FIG. 1, each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 148 via the transparent conductive layer 130. The bus bars 144 and 148 include a conductive material. In an embodiment, each of the bus bars 144 and 148 can be formed using a conductive ink, such as a silver frit, that is printed over the transparent conductive layer 122. In another embodiment, one or both of the bus bars 144 and 148 can include a metal-filled polymer. In a particular embodiment (not illustrated), the bus bar 148 is a non-penetrating bus bar that can include the metal-filled polymer that is over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink. The lower transparent conductive layer 122 does not need to be patterned in this particular embodiment.

In the embodiment illustrated, the width of the non-light-emitting variable transmission device $W_{EC}$ is a dimension that corresponds to the lateral distance between the removed portions of the transparent conductive layers 122 and 130. $W_{EC}$ corresponds to one of the planar dimensions of the tintable area of the non-light-emitting variable transmission device. $W_S$ is the width of the stack between the bus bars 144 and 148. The difference in $W_S$ and $W_{EC}$ is at most 5 cm, at most 2 cm, or at most 0.9 cm. Thus, most of the width of the stack corresponds to the operational part of the non-light-emitting variable transmission device that allows for different transmission states. In an embodiment, such operational part is the main body of the non-light-emitting variable transmission device and can occupy at least 90%, at least 95%, at least 98% or more of the area between the bus bars 144 and 148.

Figure 2:
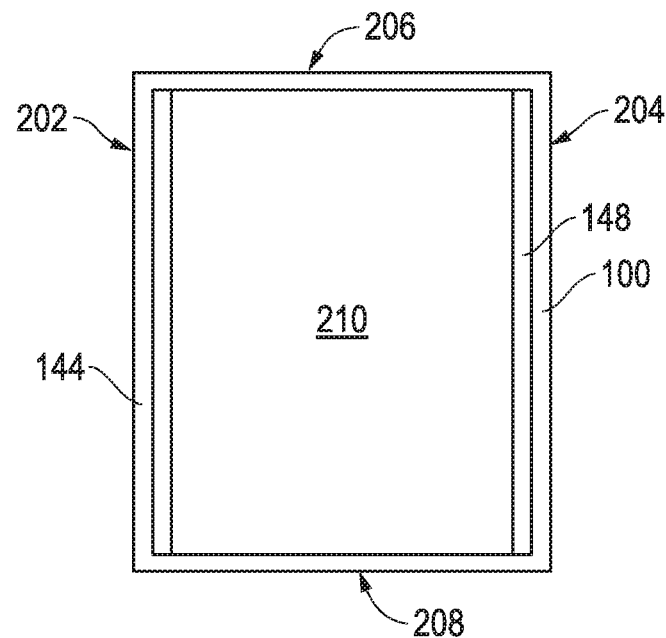
FIG. 2 includes an illustration of a top view of the glazing of FIG. 1.

FIG. 2 includes a top view of the substrate 100 and a non-light-emitting variable transmission device 210 that includes the layers as described with respect to FIG. 1. The bus bar 144 lies along a side 202 of the substrate 100, and the bus bar 148 lies along a side 204 that is opposite the side 202. Each of the bus bars 144 and 148 have lengths that extend a majority of the distance between a side 206 and a side 208 that is opposite the side 206. In a particular embodiment, each of the bus bars 144 and 148 have a length that is at least 75%, at least 90%, or at least 95% of the distance between the sides 206 and 208. The lengths of the bus bars 144 and 148 are substantially parallel to each other.

As used herein, substantially parallel is intended to means that the lengths of the bus bars 144 and 148 are within 10 degrees of being parallel to each other. Along the length, each of the bus bars has a substantially uniform cross-sectional area and composition. Thus, in such an embodiment, the bus bars 144 and 148 have a substantially constant resistance per unit length along their respective lengths.

Figure 3:
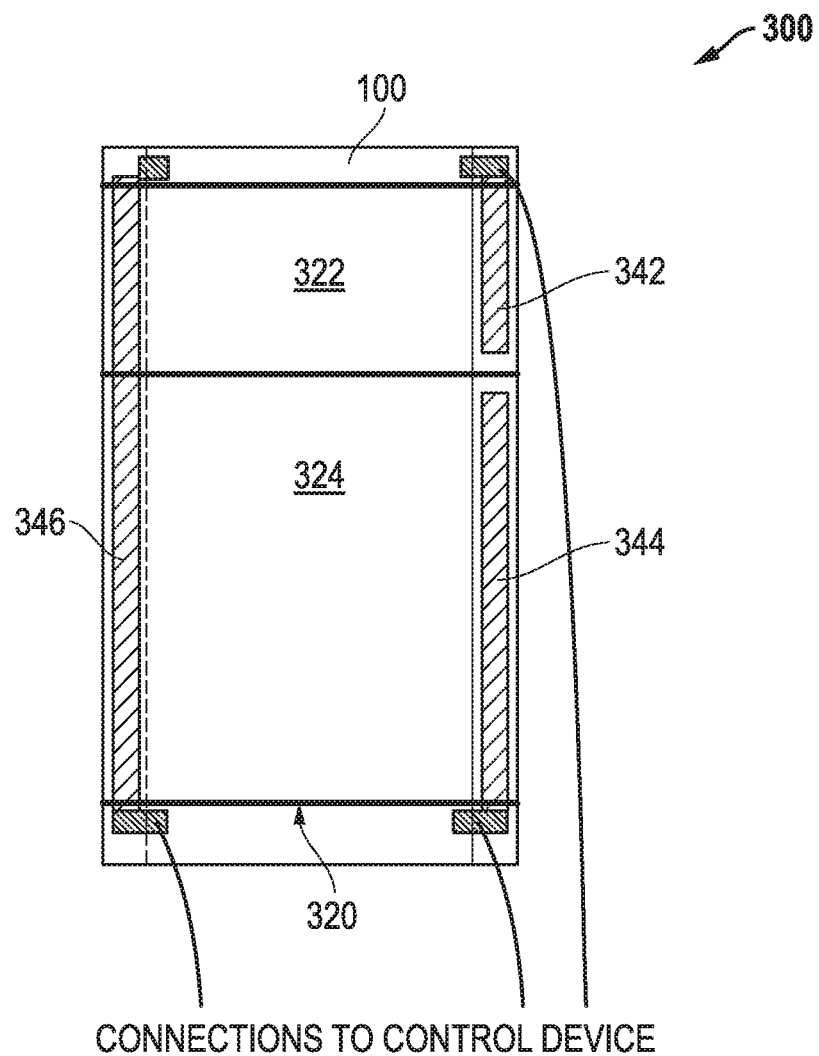
FIG. 3 includes an illustration of a top view of a glazing having different zones, where each zone includes a non-light-emitting, variable transmission device.

FIG. 3 includes a top view of a glazing 300 that includes the substrate 100 and a stack 320 that includes the layers 122, 124, 126, 128, and 130, as previously described. In FIG. 3, a P1 cut is a cut only through the lower conductive layer 122 and sometimes the electrode layer 124, the P2 cut is a cut only through the upper conductive layer 130 and sometimes the electrode layer 128, and the P4 cut is through all layers 122, 124, 126, 128, and 130. Unlike FIG. 2, the stack 320 is cut into two separate sections, corresponding to zone 322 and zone 324, each including a non-light-emitting, variable transmission device. Bus bars 342 and 344 are electrically connected to and contact the upper conductive layer 130 within zones 322 and 324, respectively. Bus bar 346 is a common bus bar for the zones 322 and 324 and is electrically connected to and contacts the lower conductive layer 122. The bus bars 342, 344, and 346 allow the zones 322 and 324 to be controlled independent of one another. In another embodiment, a glazing may have more zones. After reading this specification, skilled artisans will be able to determine the number of zones and electrical configurations (including the cuts through one or more layers of the stack 320), to achieve a design to meet the needs or desires for a particular application.

Figure 4:
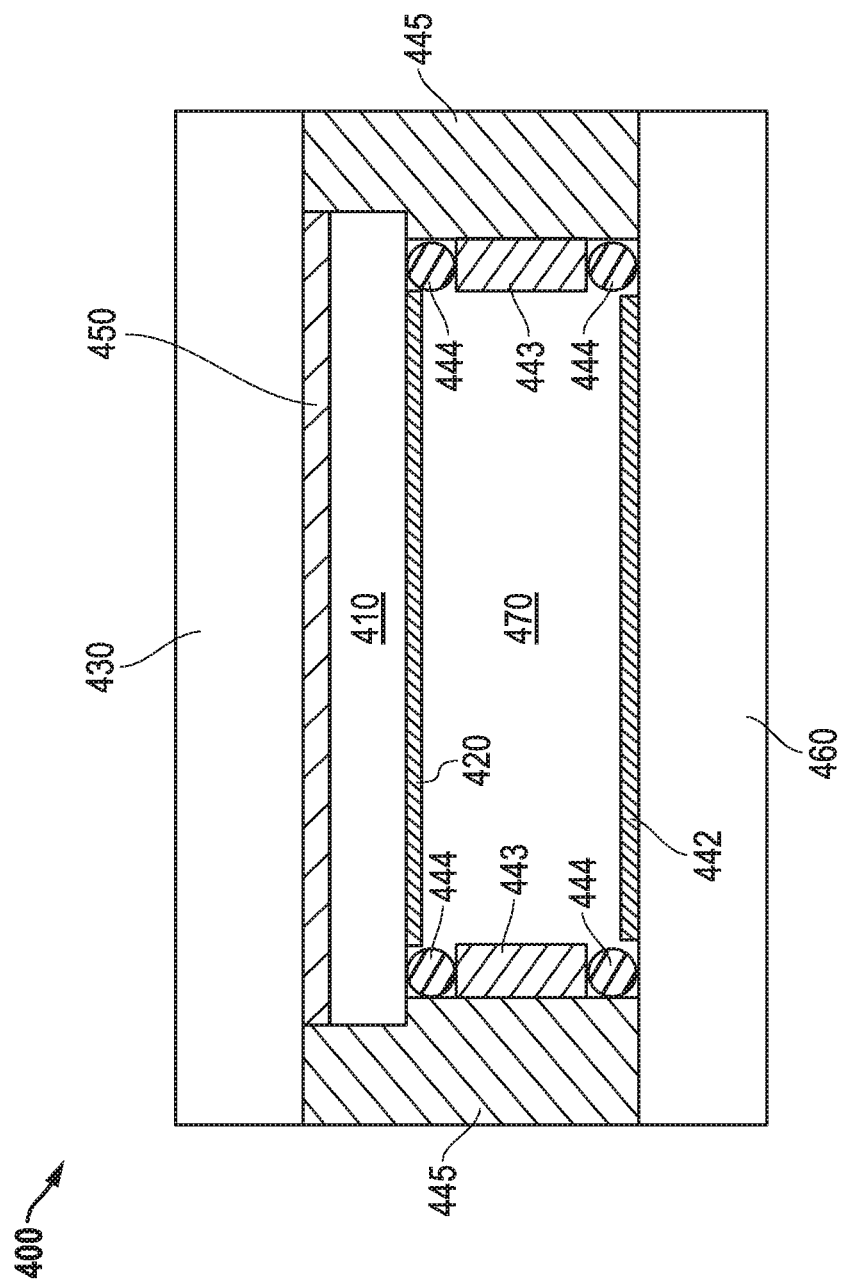
FIG. 4 includes an illustration of a cross-sectional view of an insulating glass unit including a non-light-emitting, variable transmission device.

FIG. 4 includes an illustration of an exemplary insulated glass unit 400. The insulated glass unit 400 includes an outer separate substrate 430 and a non-light-emitting, variable transmission device including the electrochromic stack 420 and substrate 410. An interlayer 450 is dispose between the substrates 410 and 430. The interlayer 450 may be a lamination adhesive. The interlayer 450 can include a thermoplastic, such as polyurethane, ethylene vinyl acetate (EVA) or polyvinyl butyral (PVB). The outer substrate 430 is coupled to a pane 460. Each of the outer substrate 430 and pane 460 can be a toughened or a tempered glass and have a thickness in a range of 2 mm to 9 mm. A layer 442 can be disposed along an inner surface of the pane 460 and include a solar control film, a low-emissivity film, or both. The outer substrate 430 and pane 460 can be spaced apart by a spacer bar 443 that surrounds the substrate 410 and stack 420. The spacer bar 443 is coupled to the outer substrate 430 and pane 460 via seals 444. The seals 444 can be a polymer, such as polyisobutylene. An adhesive joint 445 is designed to hold the outer substrate 430 and the pane 460 together and is provided along the entire circumference of the edges of the outer substrate 430 and the pane 460. An internal space 470 of the IGU 400 may include a relatively inert gas, such as a noble gas or dry air. In another embodiment, the internal space 470 may be evacuated. Other designs for IGUs may be used if needed or desired for a particular application.

The embodiments described above are merely illustrative. Other designs for non-light-emitting, variable transmission devices, other IGUs, or a combination thereof may be used. Attention is now directed the modeling of the behavior and methods of operation a non-light-emitting, variable transmission device.

Figure 5:
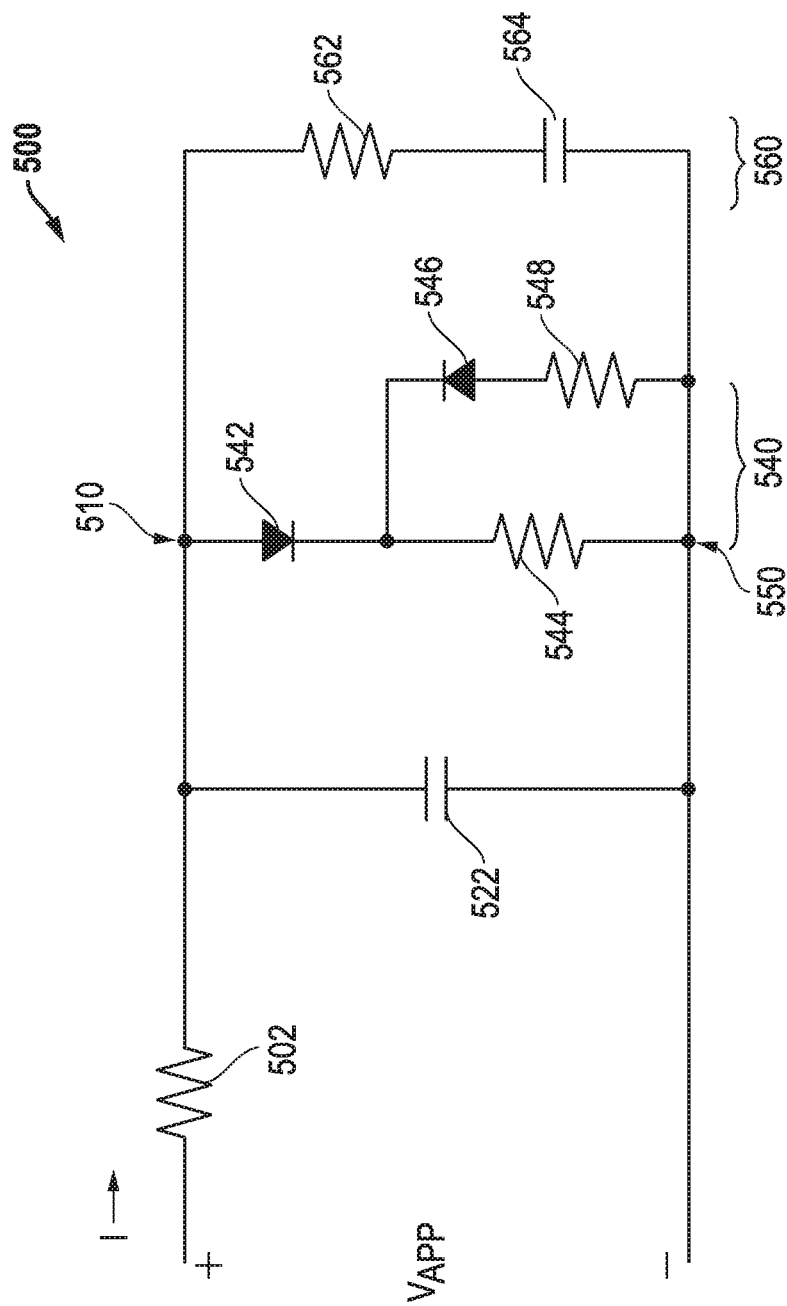
FIG. 5 includes a circuit diagram of an exemplary circuit that can be used to model the behavior of a non-light-emitting, variable transmission device.

FIG. 5 is a schematic diagram of a circuit 500 that can be used to model the behavior of a non-light-emitting, variable transmission device. An external voltage ($V_{APP}$) is applied to the circuit 500, and a current I flow through the circuit 500. Some voltage is lost due to wires, contacts, and bus bars, as represented by a resistor 502. The interval voltage ($V_{INT}$) is the voltage between nodes 510 and 550 and represents the voltage across the stack of layers 122, 124, 126, 128, and 130. $V_{INT}$ may depend on location and switching history of the non-light-emitting, variable transmission device.

The circuit 500 includes an electronic portion 540 that represents electrons flowing within the circuit, and an ionic portion 560 that represents ions flowing within the circuit. The current I is equal to the current flowing through the electronic portion 540 and current flowing through the ionic portion 560. Current though the ionic portion 560 is significant during switching operations and is significantly less, possibly even 0, when the non-transmitting device is being held at a constant visible transmittance for an extended time period. Leakage electronic current is the current through the electronic portion 540 when the non-transmitting device is being held at a constant visible transmittance at and after the extended time period.

Other parts of the circuit 500 are described to provide a better understanding of the circuit and how it corresponds to the non-light-emitting, variable transmission device. Capacitor 522 represents the equivalent capacitance between the transparent conductive layers 122 and 130. Diode 542 is used to represent that electronic leakage current is very close to zero in the reverse direction. However, when the non-light-emitting, variable transmission device is in a fully bleached state, reverse electronic leakage current can be as large as forward electronic leakage current. Resistors 544 and 548, and diode 546 closely approximate the electronic leakage current behavior of the non-light-emitting, variable transmission device, as it has a solid-state ion conductive layer. Electronic current increases linearly with voltage up to a threshold voltage, beyond which current increases much more rapidly. The voltage across the diode 546 is typically between 1.5 V and 2.0 V. The resistance of resistors 544 and 548 depend on device dimensions. In an embodiment, the resistance of resistor 544 is at least an order of magnitude greater than the resistance of the resistor 548. The resistances of the resistors 544 and 548 and voltage corresponding to the diode 546 may depend on temperature.

The resistor 562 corresponds to the ionic impedance of the non-light-emitting, variable transmission device. The ionic impedance can be a function of both device visible transmittance and the temperature of the device. The ionic impedance can vary by more than an order of magnitude over the operating temperature range (−40 C to 100 C) of the non-light-emitting, variable transmission device. The non-light-emitting, variable transmission device can act similar to a battery, and thus, capacitor 564 represents the effect of the battery. The voltage between the electrodes of the capacitor 564 can be in a range of −1.0 V to +2.0V. In A particular embodiment, voltage differences between the electrodes of the capacitor 546 can be in a range of 0.0 V (for fully bleached) and +1.5 V (for fully tinted).

The inventors have discovered that more accurate characterization, including derived parameters can be achieved when the non-light-emitting, variable transmission device is held at an operating parameter corresponding to an intermediate visible transmittance for a sufficiently long period of time before using voltage, current, and other measurements to generate or update characterization data.

Figure 6:
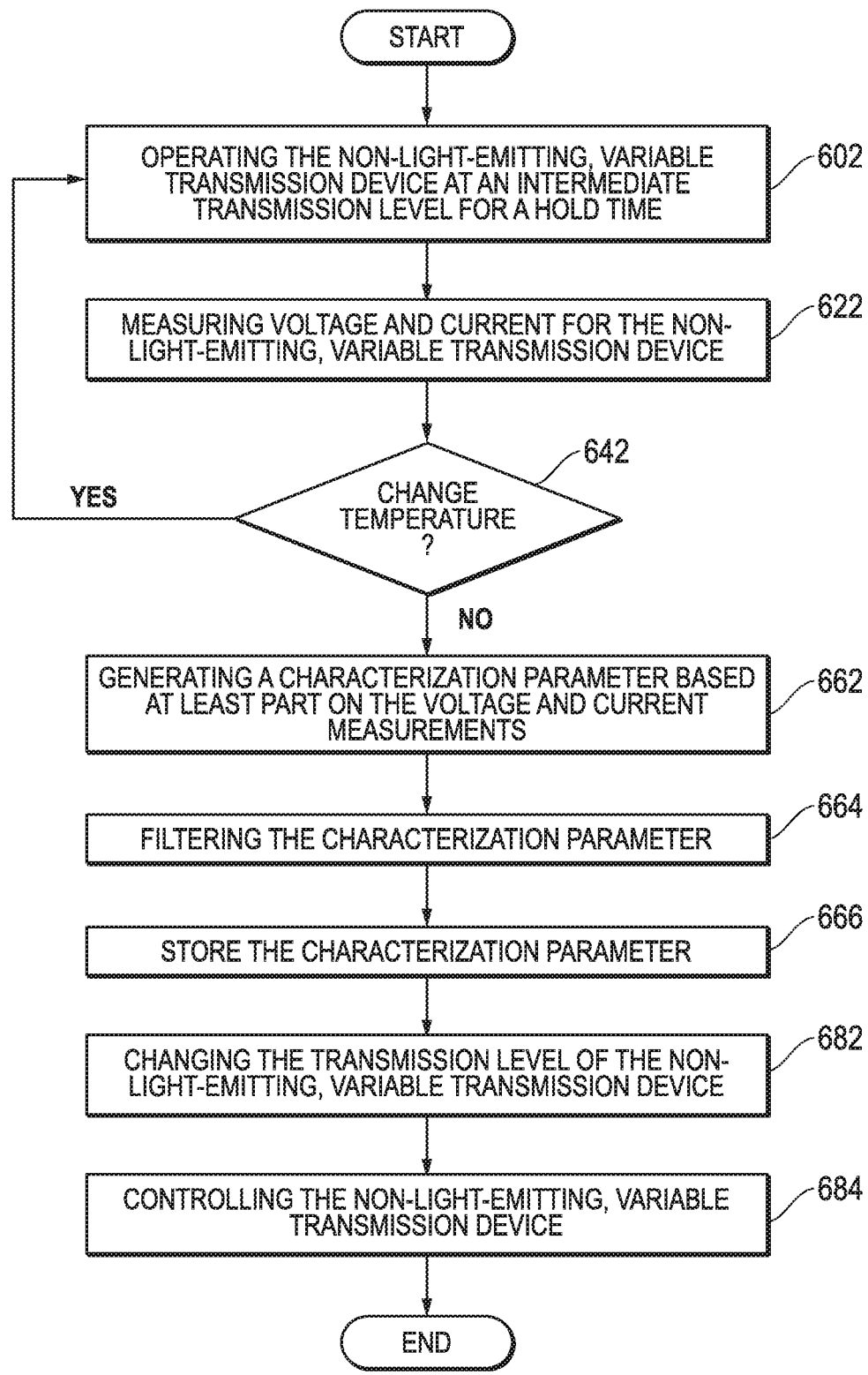
FIG. 6 includes a flow diagram for operating a non-light-emitting variable transmission device.

FIG. 6 includes a flow chart for a method of operating a non-light-emitting, variable transmission device. FIGS. 1 and 5 are referenced during portions of the flow chart to aid in understanding the method. A first portion of the method is related to characterizing the non-light-emitting, variable transmission device for applied voltages, and a second portion is related to generating a characterization parameter and using the characterization parameter to control the non-light-emitting, variable transmission device. The control can occur during normal operation of the non-light-emitting, variable transmission device.

The method includes operating the non-light-emitting, variable transmission device at an operating parameter for a time period, at block 602 in FIG. 6. The operating parameter can be $V_{APP}$, a current, or other suitable parameter used in operating the non-light-emitting, variable transmission device. Operating may be part of a separate calibration or characterization operation or may occur during normal operation of the non-light-emitting, variable transmission device. The inventors have discovered that better quality data can be obtained by holding the operating parameter for a relatively longer period of time as compared to before the invention was conceived. The difference will become more apparent, particularly with respect to FIG. 7.

When the non-light-emitting, variable transmission device is at fully tinted or fully bleached state, the characterization data may not be sufficiently accurate for improved control of the non-light-emitting, variable transmission device. In an embodiment, the intermediate visible transmittance is at least 1%, at least 2%, or at least 10% of a difference between a fully tinted visible transmittance and a fully bleached visible transmittance for the non-light-emitting, variable transmission device. In another embodiment, the intermediate visible transmittance is at most 99%, at most 98%, or at most 90% of a difference between a fully tinted visible transmittance and a fully bleached visible transmittance for the non-light-emitting, variable transmission device. Referring to FIG. 5, $V_{APP}$ is the voltage applied to the non-light-emitting, variable transmission device to achieve the intermediate visible transmittance. During this time, $V_{APP}$ is the applied hold voltage. More than one intermediate visible transmittance may be used to provide more characterization data.

Relatively longer holding times can help reach steady state operation of the non-light-emitting, variable transmission device at a particular visible transmittance. Referring to FIG. 5, energy may need to be stored or dissipated from the capacitors 522 and 564. In particular, the movement of ions between the electrode layers 124 and 128 via the ion conductive layer 126, which corresponds to changing capacitance of the capacitor 564, may take a relatively long period of time. Thus, the hold time is sufficient to reach steady state for ion migration, meaning that little, if any, net migration of ions through the ion conductive layer 126. When the net ionic current through the ionic portion 560 of the circuit 500 becomes 0, substantially all current flow through the circuit 500 is leakage current that flows through the electronic portion 540. Thus, at steady state, the current within the circuit 500 is substantially the same as the leakage current. Previously, $V_{APP}$ have been held for less than 0.5 hour. In an embodiment, $V_{APP}$ is held for at least at least 0.5 hour, at least 0.6 hour, or at least 0.8 hour. Although there is no theoretical upper limit on the time, too long of a time may affect throughput. In another embodiment, the time is at most 12 hours, at most 5 hours, or at most 2 hours. Times longer that 12 hours may be used for the non-light-emitting, variable transmission device when the area of the non-light-emitting, variable transmission device is relatively large (e.g., at least 2 $m^2$) and the distance between the bus bars (e.g., between the bus bars 144 and 148) is relatively long (e.g., at least 1 m apart). In another embodiment, the change in current as a function of time (dI/dt) can be monitored, and when the change in current is within a specified window (e.g., −0.01 A<I<+0.01 A) for a predetermined time (e.g., at least 15 minutes, at least 30 minutes, or the like), the non-light-emitting, variable transmission device may be considered to be at steady state. After reading this specification, skilled artisans will be able to determine a particular hold time that works well for a particular application.

The method can further include measuring voltage and current for the non-light-emitting, variable transmission device, at block 622. During the characterization process, data in the form of $V_{APP}$ and current flowing through the circuit 500 can be collected. With respect to subsequent control of the non-light-emitting, variable transmission device, measuring applied voltage and a holding current are significant. The applied voltage and current can be obtained after the non-light-emitting, variable transmission device is at steady state at the intermediate visible transmittance. A parameter such as leakage current can be more accurately determined as compared to previously-used techniques. Still, some of the characterization data is obtained using voltage and current measurements before or before and after reaching steady state.

In an embodiment, a separate calibration or characterization operation may be performed. For example, the non-light-emitting, variable transmission device may not have been installed or only recently installed. In such an embodiment, no or insufficient operating data may be available. Data may be gathered at more than one temperature. During normal operation, changes in temperature will occur as a natural consequence of being a window being exposed to an outdoor ambient. The method can include making a decision whether or not to change the temperature, at diamond 642. The characteristics of a non-light-emitting, variable transmission device can be affected by temperature. The non-light-emitting, variable transmission device may be at temperatures in a range of −40° C. to +90° C. When the non-light-emitting, variable transmission device is relatively cooler, a larger $V_{APP}$ can be used without damaging the non-light-emitting, variable transmission device, and a longer time may be needed to achieve the intermediate visible transmittance, as compared to the same non-light-emitting, variable transmission device at a warmer temperature. Leakage current and other electrical parameters can be affected by temperature. Further data may be obtained for the same visible transmittance at one or more different temperatures. If the temperature is changed ("Yes" branch), the method returns to block 602, otherwise, the method continues ("No" branch) to block 662. Note that $V_{APP}$ may be changed to achieve the same intermediate visible transmittance at a different temperature.

Temperature of the non-light-emitting, variable transmission device can be determined using an impedance of the non-light-emitting, variable transmission device. In particular, the resistance of the resistor 562 represents the impedance and is a function of the visible transmittance and the temperature of the device. A look-up table can correlate visible transmittance and impedance to temperature. Thus, the temperature can be obtained using electrical measurements and without needing an external temperature sensor.

Data regarding an ambient condition may be obtained. The data may be obtained during the operation in block 602 and may be obtained outside of the time period in block 602. For example, the data can be obtained while the non-light-emitting, variable transmission device after it is installed, regardless whether the non-light-emitting, variable transmission device is operating. The ambient condition can include a temperature, a humidity, a physical stress, an electrical stress, or any combination thereof. The temperature may be a temperature of the non-light-emitting, variable transmission device, an outdoor air temperature, an indoor air temperature, a rate of change of temperature of any of the foregoing as a function of time, or any combination thereof. The physical stress can correspond to an object (a tree branch, hail, a ball, a stone, or the like) hitting a window that includes the non-light-emitting, variable transmission device. The physical stress may correspond to a pressure due to high velocity winds. The physical stress can also occur as a result of a temperature change due to a mismatch of coefficients of thermal expansion of glazings (e.g., substrates 410 and 430 in FIG. 4). An electrical stress may occur when the non-light-emitting, variable transmission device is operated outside its normal operating states. Examples include power outages and power surges that may occur when a power source providing $V_{APP}$ is turned on or abruptly disconnected. The list of ambient conditions is illustrative and not intended to be a comprehensive list of all ambient conditions. In an embodiment, data for more than one ambient conditions may be obtained.

The method can also include generating a characterization parameter based at least part on the voltage and current measurements, at block 662. The ambient condition may or may not be used in generating the characterization parameter. In an embodiment, the characterization parameter can be generated based at least part on the voltage and current measurements obtained during the time period in block 602. The characterization parameter can be used in the control techniques to better control the non-light-emitting, variable transmission device. A variety of characterization parameters can be generated. If a characterization parameter exists, generating the characterization can include updating the characterization parameter The internal voltage ($V_{INT}$) of the non-light-emitting, variable transmission device (voltage difference between nodes 510 and 550 in FIG. 5) can be obtained by subtracting the voltage drop across the resistor 502 from $V_{APP}$. The resistance for the resistor 502 corresponds to a wire, an electrical connector, a bus bar, or any combination thereof (e.g., (impedance from sources outside the layers 122, 124, 126, 128, and 130 in FIG. 1). The resistance of the resistor 502 is not significantly affected by temperature, $V_{APP}$, or device state, so the resistance of the resistor 502 can be treated as a constant value.

A leakage parameter can the current divided by voltage divided by an area corresponding to the non-light-emitting, variable transmission device. In an embodiment, the leakage parameter can be a holding current divided by a product of an internal holding voltage ($V_{APP}$ for the intermediate visible transmittance less the voltage corresponding to the resistor 502) of the non-light-emitting, variable transmission device times an area corresponding to the non-light-emitting, variable transmission device. The area corresponding to the non-light-emitting emitting, variable transmission device can be an area of an insulated glass unit (IGU) that includes the non-light-emitting, variable transmission device, an area of a glazing that includes the non-light-emitting, variable transmission device, or a tintable area of the non-light-emitting, variable transmission device. Referring to FIG. 1, one of the dimensions of the tintable area is $W_{EC}$. When the IGU or glazing includes only one non-light-emitting, variable transmission device that occupies most of the area of the IGU or glazing, the area can be approximated with the area of the IGU or glazing. When a glazing includes more than one zone, such as illustrated in FIG. 3, the area of the zones 322 and 324 can be defined by the P1, P2, and P4 cuts. Alternatively, the area of the zones 322 and 324 can be defined by the P4 cuts in one direction and the distance between the P1 and P2 cuts in the other direction. The distance between the P1 and P2 cuts can be approximated by the distance between the bus bars, such as the distance between the bus bars 342 and 346 for zone 322, and the distance between the bus bars 344 and 346 for zone 324.

Open circuit voltage ($V_{OC}$) can also be generated. In a plot of visible transmittance (y-axis) as a function of $V_{INT}$ (x-axis), $V_{OC}$ can be the x-axis intercept. In an embodiment, non-light-emitting, variable transmission device can be held at at least two different applied voltages corresponding to intermediate transmission states for extended periods of time (e.g., at least 0.5 hour). If the voltages are $V_{PP}$, they can be converted to $V_{INT}$ as previously described. A plot of visible transmittances versus $V_{INT}$ can yield a line that can be extrapolated to a visible transmittance of 0 (i.e., y=0), and $V_{OC}$ can be the voltage where the line corresponds to a visible transmittance of 0 (x intercept).

In another embodiment, $V_{OC}$ can be obtained during data collection of voltage and current measurements by temporarily disconnecting the non-light-emitting, variable transmission device from a voltage source providing $V_{APP}$ after the non-light-emitting, variable transmission device is at steady state. After disconnecting, the voltage reading across the terminals of the circuit 500 may be taken relatively quickly (e.g., at most 10 s, at most 5, at most 1 s, or even a shorter time) after the circuit 500 is opened. This voltage reading can be reduced by the voltage drop across the resistor 502 to obtain $V_{OC}$.

An intercalating charge parameter may be obtained. An ion, such as $H^+$, $Li^{30}$, $Na^{30}$, or the like, may be used to help cause the change in visible transmittances. Not all of the ions introduced during the fabrication of the non-light-emitting, variable transmission device may be effectively used to affect visible transmittances. For example, the ion may react to form a compound (e.g., some $Li^+$ may become Li—Ni-metal oxide) and is no longer a free ion. Further, the layers 122, 124, 126, 128, 130, or any combination thereof may have charge traps that can trap charge. The trapped charge can reduce or prevent the ion from be able to migrate during a visible transmittance change. Thus, the intercalating charge parameter can correspond to the amount of ions that can readily migrate (also called mobile ions) and affect the transmission. The intercalating charge parameter can be the ionic current of portion 560 of the circuit 500 integrated over time and divided by the area corresponding to the non-light-emitting, variable transmission device. The area corresponding to the non-light-emitting, variable transmission device can be any of the areas previously described with respect to the leakage parameter.

The list of characterization parameters above are illustrative and do not limit the number of different types of parameters that be generated from the voltage and current measurements and used to aid in control of the non-light-emitting, variable transmission device. After reading this specification, skilled artisan will be able to determine what characterization parameters to generate in view of improved control when operating of the non-light-emitting, variable transmission device.

The method further includes filtering the characterization parameter, at block 664. Filtering is performed so that the parameter used in controlling the non-light-emitting, variable transmission device is not based on a single pair of voltage and current readings that result in only a single value for the parameter. The single value may be an outlier or otherwise not representative of the characteristics of the non-light-emitting, variable transmission device. Filtering can include taking an average or median value for the characterization parameter. Filtering may include other techniques that can be used in addition to or alternative to obtaining an average or median value. For example, only the $5^{th}$ to $95^{th}$ percentile, the $10^{th}$ to $90^{th}$ percentile, or another range for the values of the parameter may be used to avoid using values outside the percentile ranges, as these are more likely to be affected by external factors, such as power outage, a significant change in temperature during holding, or the like. Other statistical techniques can be used to determine if a particular value for the parameter should be rejected from the set.

Still further, a characterization parameter may change over time, and data is older than a date, such as date over a year old, over six months old, or the like, may no longer be used for the character parameter. In another embodiment, data from a particular season but not another season may be used for filtering. For example, data from winter, and not summer, may be used for the characterization parameter during winter, or data from summer, and not winter, may be used for the characterization parameter during summer. Another filtering technique may be used if needed or desired.

Filtering is optional, so in another embodiment, only one value for the characterization parameter may be generated. After reading this specification, skilled artisans will be able to determine whether filter should be used, and if filtering is used determine a technique for filtering to provide a value for the characterization parameter that more accurately reflects the operation of the non-light-emitting, variable transmission device, as compared to using generating a single value for the characterization parameter.

The method can include storing the characterization parameter, at block 666. The characterization of the non-light-emitting, variable transmission device may be performed at a fabrication site, and the parameter generated during characterization may be used after the non-light-emitting, variable transmission device is installed. Alternatively, the non-light-emitting, variable transmission device may be characterized shortly after installation; however, the characterization parameter generated during characterization may be used for days, weeks, or even years after the characterization is performed. In another embodiment, data may be obtained only during normal operation or the data may be obtained during normal operation and a separate calibration or characterization operation. The characterization parameter can be stored in memory, and in a particular embodiment, the characterization parameter can be stored in persistent memory or another relatively permanent form. Examples of such memory can include a non-volatile memory, a hard disk, a field programmable gate array, an application specific integrated circuit, or the like. The characterization parameter may be stored in a cache, random access memory, or other volatile memory; however, if power to the cache, random access memory, or other volatile memory is lost, the characterization parameter will no longer be stored in such memories. The characterization parameter may be stored in a persistent memory and a copy of the characterization parameter can be written into a cache, random access memory, or other volatile memory for quick access to a processor.

The method can include changing the visible transmittance of the non-light-emitting, variable transmission device, at block 682. The change can be from one visible transmittance to a different visible transmittance. The change can be to decrease transmission or to increase transmission of light through the non-light-emitting, variable transmission device. The voltage applied to the non-light-emitting, variable transmission device can depend on the temperature. Thus, a look-up table or other information can be used to determine a voltage to be used for the temperature.

The method can further include controlling the non-light-emitting, variable transmission device, at block 684. The control is based at least in part on the characterization parameter. More that one characterization parameter can be used if needed or desired, and the characterization parameter (s) actually used may depend on the controlling technique. The control can be during normal operation of the non-light-emitting, variable transmission device. Data can be obtained during the time period of the control. The data can include voltage, current, an ambient condition, other suitable data that affects the characterization parameter, or the like. The characterization parameter can be updated based at least part on such data. The non-light-emitting, variable transmission device can be controlled for another time period based at least in part on the updated characterization parameter. If the non-light-emitting, variable transmission device is operated at a fully bleached or fully tinted state, data corresponding to such an operating state may be excluded, as the quality of such data is relatively low compared to intermediate visible transmittances and may provide an updated characterization parameter that is relatively less reflective of the operation of the non-light-emitting, variable transmission device.

Figure 7:
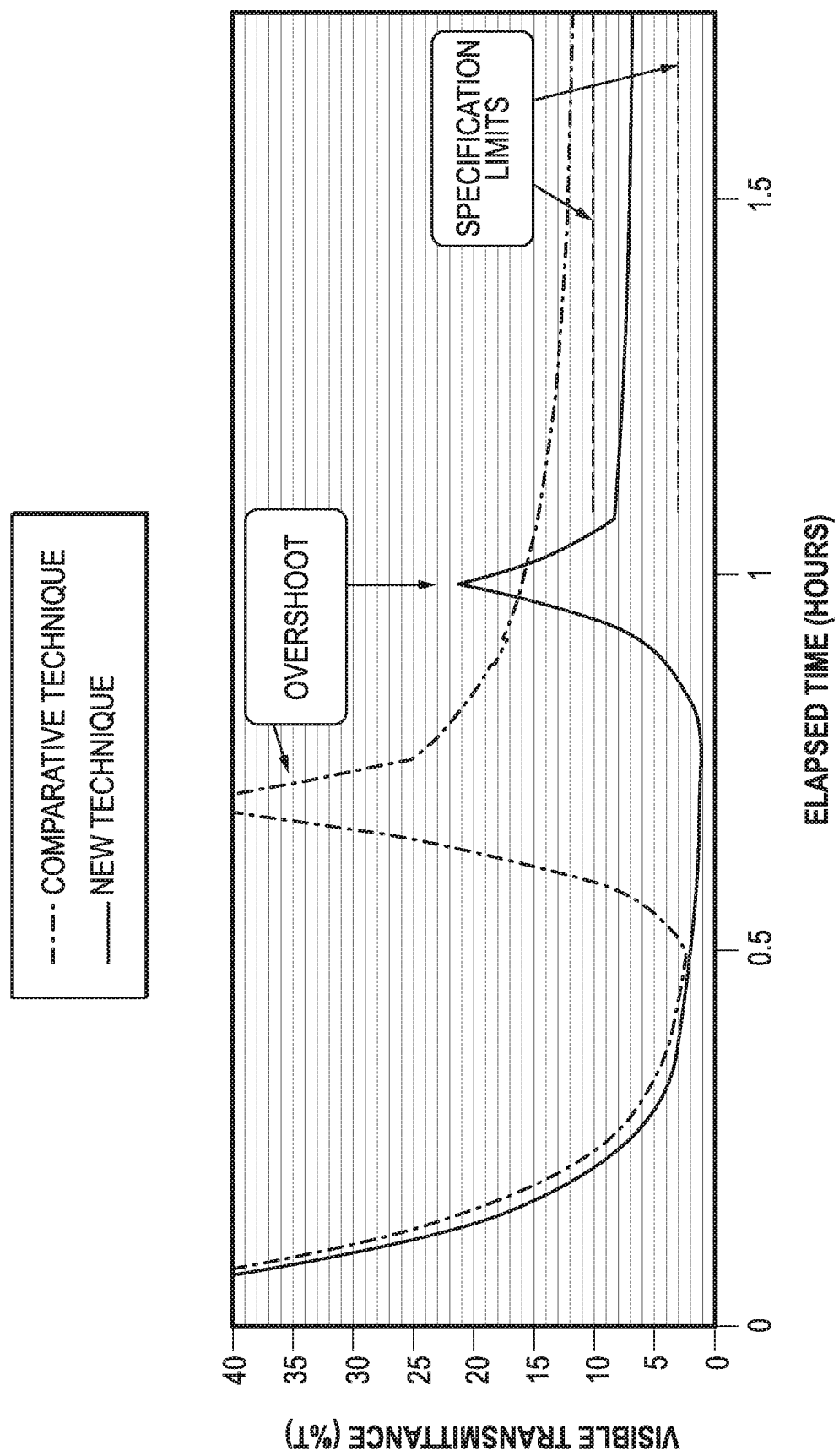
FIG. 7 includes a plot illustrating better control when operating a non-light-emitting, variable transmission device in accordance with a method as described herein.

The improvement in the control of the non-light-emitting, variable transmission device is illustrated in the plot of FIG. 7 that compares a prior control technique as compared to the new control technique that uses a characterization parameter generated using the characterization data collected as described above. The non-light-emitting, variable transmission device is part of an IGU, and the non-light-emitting, variable transmission device occupies most of the visible area of the IGU. The IGU has a visible area of 1.7 m×1.5 m. The non-light-emitting, variable transmission device starts from a fully bleached state and is changed to a visible transmittance of 6% through the non-light-emitting, variable transmission device. The specification limits are 2% on the lower end and 10% at the upper end.

The prior technique reaches about 2% visible transmittance in just before 0.5 hour. The non-light-emitting, variable transmission device is put into an overshoot mode where an overshoot voltage is applied to the non-light-emitting, variable transmission device. The overshoot mode allows for better uniformity in transmission across the non-light-emitting, variable transmission device. If the non-light-emitting, variable transmission device is to go from a higher visible transmittance to a lower visible transmittance, the overshoot voltage is a bleaching voltage. If the non-light-emitting, variable transmission device is to go from a lower visible transmittance to a higher visible transmittance, the overshoot current is a tinting voltage. The overshoot voltage is applied for approximately a ¼ hour. After the overshoot voltage, the voltage is set to the value corresponding to a visible transmittance of 6%. Even after two hours since the method started, the non-light-emitting, variable transmission device is at about 11% visible transmittance, which is still not within the specification limits.

The new technique holds the non-light-emitting, variable transmission device at an applied voltage corresponding to the low visible transmittance for a longer period of time. At approximately 0.8 hour, the non-light-emitting, variable transmission device reaches a visible transmittance of approximately 1%. Similar to the prior technique, an overshoot mode is used for about a ¼ hour. The voltage used when supplying the overshoot current is less than the prior control technique. After the overshoot current, the voltage is set to the value corresponding to a visible transmittance of 6%. The visible transmittance is within the specification limits just under 1.1 hours after the method started. At approximately 1.4 hours, the visible transmittance is less than 7%. Accordingly, better quality data used to generate a characterization parameter can lead to better control of the non-light-emitting, variable transmission device.

A method can be used to operate a plurality of non-light-emitting, variable transmission devices. In an embodiment, the method for the plurality of non-light-emitting, variable transmission devices can leverage the method corresponding to FIG. 6; however, the method corresponding to FIG. 6 that is directed to a non-light-emitting, variable transmission device is not required when operation the plurality of the non-light-emitting, variable transmission devices. The method for the plurality of non-light-emitting, variable transmission device can be particularly useful for a set of windows including non-light-emitting, variable transmission devices and to a single window that includes a plurality of zones each including an independently controlled non-light-emitting, variable transmission device. Although non-light-emitting, variable transmission devices can be designed to have the same composition and thickness of layers and have the same cuts and bus bars, differences still occur due to manufacturing variation, even with the best controlled processes. The difference can become vary apparent when operating as a set of non-light-emitting, variable transmission devices that are located close to one another.

Figure 8:
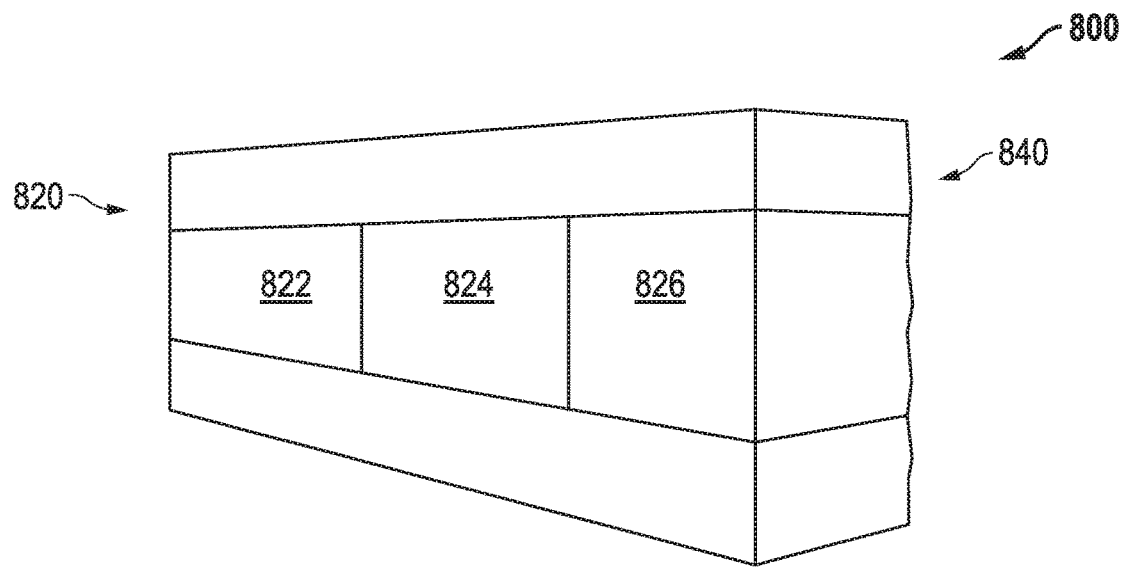
FIG. 8 includes an illustration of a building that has a wall with non-light-emitting, variable transmission devices.
Figure 9:
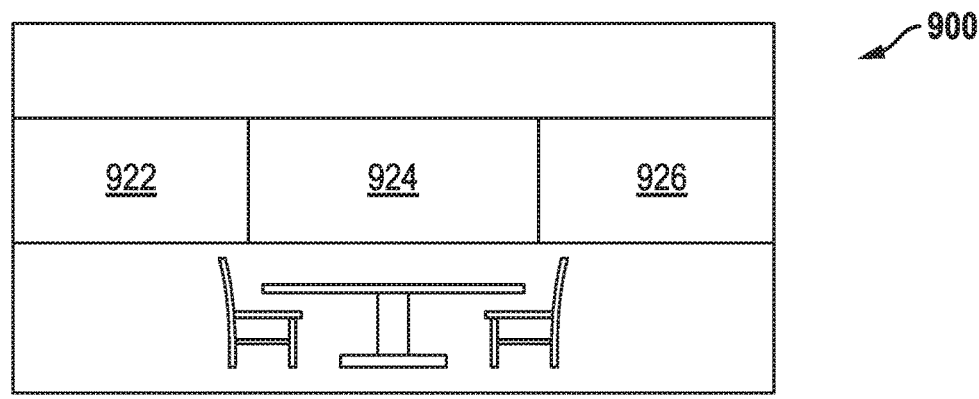
FIG. 9 includes an illustration of a room that has a wall with non-light-emitting, variable transmission devices.
Figure 10:
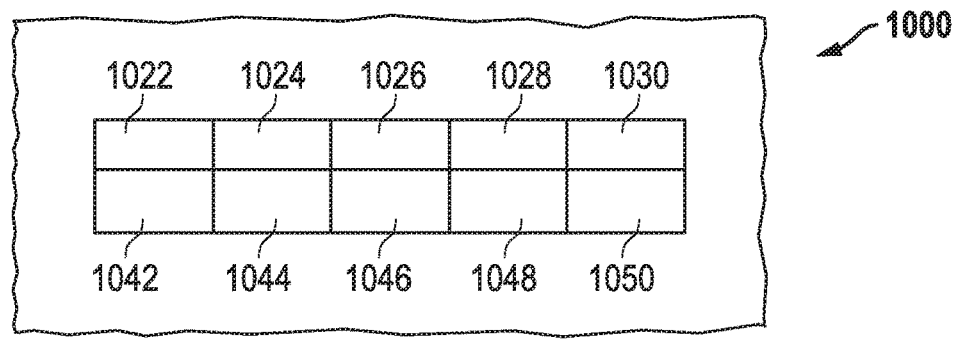
FIG. 10 includes an illustration of a skylight that has a wall with non-light-emitting, variable transmission devices.

FIG. 8 includes a perspective view of a portion of a building 800 that includes walls 820 and 840. Windows 822, 824, and 826 are along the wall 820. FIG. 9 includes an illustration of a room 900 that includes window 922, 924, and 926 along the same wall. FIG. 10 includes an illustration of a skylight 1000 that includes panes 1022, 1024, 1026, 1028, 1030, 1042, 1044, 1046, 1048, and 1050. Each of the windows and panes in FIGS. 8 to 10 includes a non-light-emitting, variable transmission device. Before the inventors' discovery, all non-light-emitting, variable transmission devices along a wall or skylight or even for an entire building may be controlled using the same parameters and data. Thus, the non-light-emitting, variable transmission devices are controlled the same, even though each non-light-emitting, variable transmission device may vary slightly in its characteristics, some of which may not be apparent until after installation is completed. Along a wall or within a skylight, a non-light-emitting, variable transmission device that responds differently to the applied voltage compared to the other non-light-emitting, variable transmission devices at the same applied voltage can be easily be detected by a human having average eyesight, as even slight differences in the visible transmission can be seen.

The methods as previously described can be used even after the non-light-emitting, variable transmission device are installed, and thus, ongoing measurements can be used to generate characterization data that can be used to adapt the control techniques to improve performance of the non-light-emitting, variable transmission devices. Also, the non-light-emitting, variable transmission devices may degrade at different rates. Further, one of the non-light-emitting, variable transmission devices along a wall or skylight may have been replaced with a newer non-light-emitting, variable transmission device that has not degrade as compared to the non-light-emitting, variable transmission device. In such situations, different characterization data can be used. The characterization data may be collected at nearly any different level, even down to the individual non-light-emitting, variable transmission device. Thus, the control techniques can allow different non-light-emitting, variable transmission devices along a wall or within the skylight to be at different applied voltages and achieve substantially the same transmittance. Thus, pane-by-pane differences in transmission can be reduced.

Alternatively, when different visible transmittances are to be used along a wall or within the skylight can be controlled more predictably. For example, non-light-emitting, variable transmission devices may be graded, so that the non-light-emitting, variable transmission device closest to one side of a wall has a highest visible transmittance and a lowest visible transmittance near the opposite side. The changes should be gradual. With the prior technique, a non-light-emitting, variable transmission device near the middle of the wall may have a visible transmittance that is higher or lower than each of its immediately adjacent non-light-emitting, variable transmission devices, and thus, the transition in visible transmittances looks strange. With the new technique, more uniform, more predictable, or more uniform and predictable visible transmittance can be achieved.

Thus, a wall or skylight can have a more uniform appearance or have a visible transmission pattern that is closer to the desired appearance.

Figure 11:
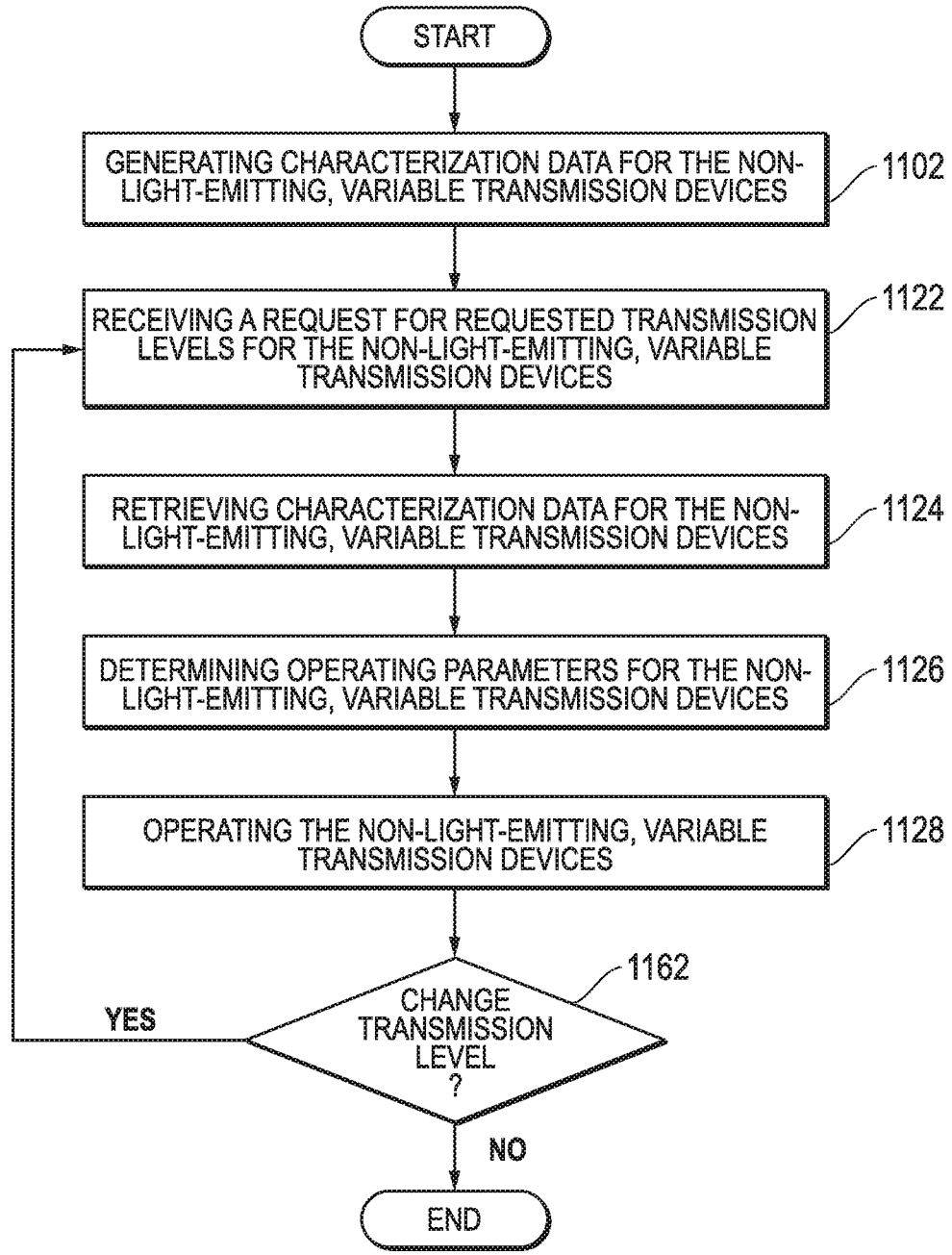
FIG. 11 includes a flow diagram for operating a plurality of non-light-emitting variable transmission devices.

FIG. 11 includes a process flow for a method of operating a plurality of non-light-emitting, variable transmission devices. The method can include generating characterization data for the non-light-emitting, variable transmission devices, at block 1102. The generation of the characterization data can be performed as previously described with respect to FIG. 6. In another embodiment, a different method can be used to generate the characterization data. The characterization data can include parameters and information derived from voltage and current readings when testing or operating the non-light-emitting, variable transmission devices.

The characterization data generated can be different for any one or more pairs of non-light-emitting, variable transmission devices. This allows for better data to control the non-light-emitting, variable transmission devices. Each non-light-emitting, variable transmission device can have its own characterization data, or some, but not all, non-light-emitting, variable transmission devices may share characterization data. For example, all non-light-emitting, variable transmission devices fabricated within the same production lot should have the same or nearly the same characterization data. Thus, they may share the same characterization data. In another example, even within the same production lot, some of the non-light-emitting, variable transmission devices may have their electrode layer 128 deposited in one sputtering tool, and other non-light-emitting, variable transmission devices may have their electrode layer 128 deposited in another sputtering tool. In this example, different sets of characterization corresponding to the different sputter tools may be generated for non-light-emitting, variable transmission devices within the same production lot. After reading this specification, skilled artisans will be able to determine how many sets of characterization data is to be generated for the non-light-emitting, variable transmission devices.

The method can include receiving a request for requested visible transmittances for the non-light-emitting, variable transmission devices, at block 1122. The requested visible transmittances can be the same or different. A percentage difference in requested visible transmittances for any pair non-light-emitting, variable transmission devices can be:

$$\text{difference}_{RT12} = 100\% * (|TL_{1R} - TL_{2R}|)/TL_{1R},$$

wherein:

$\text{difference}_{RT12}$ is a percentage difference in the requested visible transmittances for the first and second non-light-emitting, variable transmission devices;

$TL_{1R}$ is the first requested visible transmittance for the one of the non-light-emitting, variable transmission devices;

$TL_{2R}$ is the second requested visible transmittance for another of the non-light-emitting, variable transmission device.

The $\text{difference}_{RT12}$ may be at most 3%, at most 2%, or at most 1%. In a particular embodiment, all non-light-emitting, variable transmission devices are to have the same visible transmission, and thus, the requested visible transmittances for all non-light-emitting, variable transmission devices along a wall or skylight may be the same. The request may come from a building management system, a human, or another source external to the apparatus or may be self-initiated within the apparatus (e.g., the day of the year and time correspond to being after sunrise).

The method can further include retrieving characterization data for the non-light-emitting, variable transmission devices, at block 1124. The characterization data can be stored in a memory within the apparatus or external to the apparatus. The data may be in any of the memories as previously described with respect to storing the parameter with respect to FIG. 6.

The method can further include determining operating parameters for the non-light-emitting, variable transmission devices, at block 1126. A processor within the apparatus can use the information from the transmission requests for the non-light-emitting, variable transmission devices and at least portions of their corresponding characterization data with a control technique to provide signals to the non-light-emitting, variable transmission devices to achieve the desired visible transmission. The control signals to the non-light-emitting, variable transmission devices can be better tailored for each of the non-light-emitting, variable transmission devices. A prior technique would use the same applied voltage for all windows along a wall. A human would be able to detect variations in visible transmittance between different non-light-emitting, variable transmission devices even when the same visible transmittance is desired.

The novel technique produces a significantly more uniform visible transmittance between the non-light-emitting, variable transmission devices when such non-light-emitting, variable transmission devices are to have the same visible transmittance. Thus, different operating parameters can be used for one or more pairs of different non-light-emitting, variable transmission devices, even when such non-light-emitting, variable transmission devices have substantially the same size and construction, are disposed on substrates having substantially the same size and construction, and are parts of IGUs having substantially the same size and construction. In a particular embodiment, such pairs of different non-light-emitting, variable transmission devices may have different internal voltages in order to achieve substantially the same visible transmission. When the non-light-emitting, variable transmission devices are to have different visible transmittances, the novel technique allows the non-light-emitting, variable transmission devices to have visible transmittance closer to the desired visible transmittance.

The method can further include operating the non-light-emitting variable transmission devices, at block 1128. In an embodiment, the non-light-emitting variable transmission devices can be placed at the appropriate operating parameters that were determined in block 1126. In a particular embodiment, appropriate voltages can be applied to the non-light-emitting variable transmission devices. During operation, a control technique can be used to improve the performance of the non-light-emitting, variable transmission devices. The control technique can be the control technique as described with respect to FIGS. 6 and 7. In another embodiment, a different control technique can be used.

In an embodiment, each non-light-emitting variable transmission device can have an actual visible transmittance as compared to its corresponding requested transmittance. The actual visible transmittance can be determined by an optical measurement (e.g., using a sensor) or by an electrical measurement (e.g., integrating actual ionic current over time). The deviation between the requested and actual visible transmittances can be determined by the following equation.

$$\text{deviation}_{RAn} = 100\% * (|TL_{nR} - TL_{nA}|)/TL_{nR},$$

wherein:

$\text{deviation}_{RAn}$ is a percentage deviation between the requested and actual visible transmittances for a particular non-light-emitting variable transmission device;

$TL_{nR}$ is the requested visible transmittance for the particular non-light-emitting, variable transmission device;

$TL_{nA}$ is the actual visible transmittance for the particular non-light-emitting, variable transmission device corresponding to the operating parameter.

The $\text{deviation}_{RAn}$ can be at most 5%, at most 3%, or at most 1%. In practice, the requested and actual visible transmittances may not be exactly the same. Thus, the $\text{deviation}_{RAn}$ is at least 0.01%.

One or more different pairs of non-light-emitting, variable transmission devices along a wall or skylight may have different operating parameters, even though they are to have the same visible transmittance. Obtaining characterization data, using control techniques as described herein or a combination thereof can provide a more uniform visible transmittance between different non-light-emitting variable transmission devices, particular along the same wall or skylight.

The difference between the actual visible transmittances of a pair non-light-emitting variable transmission devices can be determined by the following equation.

$$\text{difference}_{AT12} = 100\% * (|TL_{1A} - TL_{2A}|)/TL_{1A},$$

wherein:

$\text{difference}_{AT12}$ is a percentage difference in actual visible transmittances for a pair of non-light-emitting, variable transmission devices;

$TL_{1A}$ is the first actual visible transmittance for one the non-light-emitting, variable transmission device within the pair;

$TL_{2A}$ is the second actual visible transmittance for the other non-light-emitting, variable transmission device within the pair.

The $\text{difference}_{AT12}$ can be at most 9%, at most 3%, or at most 1%. In practice, the actual visible transmittances for the pair of one the non-light-emitting, variable transmission device may not be exactly the same. Thus, the $\text{difference}_{AT12}$ may be at least 0.01%.

The method can include making a decision whether or not to change the visible transmittance, at diamond 1162. If the visible transmittance is to be changed ("Yes" branch), the method returns to block 1122, otherwise, the method can end ("No" branch).

Figure 12:
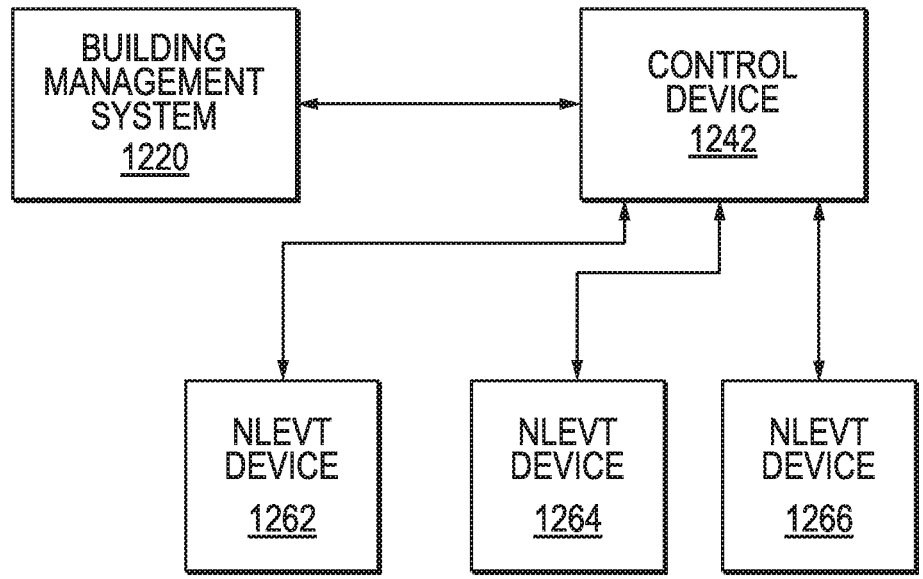
FIG. 12 includes a block diagram including exemplary devices that can be used for operating a non-light-emitting, variable transmission device.

An apparatus can be configured to perform any or all of the methods described herein. FIG. 12 includes a block diagram of an exemplary embodiment. A control device 1242 is bidirectionally coupled to a building management system 1220 and bidirectionally coupled to non-light-emitting, variable transmission (NLEVT) devices 1262, 1264, and 1266. The building management system 1220 can be used in operating environmental controls within the building, such as heating ventilation and air conditioning (HVAC), lights, the NLEVT devices, and other systems that control the environment within the building. The building management system 1220 and in another embodiment may not be used. FIG. 12, three NLEVT devices are illustrated as being coupled to the control device 1242. In another embodiment, more or fewer NLEVT devices may be bidirectionally coupled to the control device 1242. The control device 1242 can perform any one or more of the methods, including all or a portion of any such methods as described above. One or more other control devices (not illustrated) can be used in addition to the control device 1242, and such other control devices can coupled to other NLEVT devices (not illustrated). In an embodiment, an apparatus can include the control device 1242. In another embodiment, the apparatus can further include the building management system 1220, the NLEVT devices 1262, 1264, 1266, another suitable component, or any combination thereof.

Figure 13:
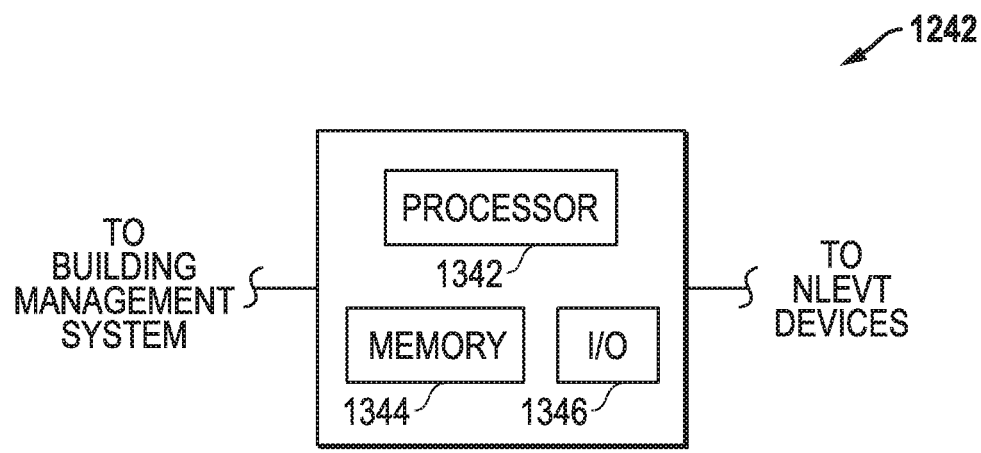
FIG. 13 includes a block diagram of an exemplary control device.

FIG. 13 includes a block diagram of components that can be in the control device 1242. The control device 1242 includes a processor 1342 that can receive and execute instructions that can be received from the building management system 1220, a memory 1344, or another source external to the control device 1242. An input/output (I/O) device 1346 can allow the control device 1242 to transmit and receive signals to the building management system 1220, the NLEVT devices 1262, 1264, and 1266, and to other components or devices, if any, coupled to the control device 1242. The memory 1344 can include any one or more of a cache, random access memory, nonvolatile memory, a hard disk, a field programmable gate array, an application specific integrated circuit, or the like. For example, a cache can be used as a buffer for data or instructions as they are provided to the processor 1342. A field programmable gate array or application specific integrated circuit can be useful for quickly providing data from look-up tables. Some or all of the instructions for the processor 1342 can be persisted in the memory 1244. Characterization parameters may be stored in the memory 1344. Operation parameters may be generated within the processor 1342, and the operation parameters can be transmitted to the NLEVT devices 1262, 1264, and 1266. Voltages, current, and potentially other data can be transmitted from the NLEVT devices 1262, 1264, and 1266 to the control device 1244 via the I/O device 1346. The description of the components as illustrated in FIGS. 12 and 13 is exemplary and not intended to be comprehensive of the only actions that can be performed by each of the devices or their components.

Actions and functions are described with respect to particular devices and components. After reading this specification, skilled artisans will appreciate that actions and functions may be performed by other devices or components. For example, the control device 1242 may not be present, and some of its actions and functions may be performed by the building management system 1220 or a device or component external to the apparatus, and other of the control device's actions and functions can be performed by the NLEVT devices 1262, 1264, and 1266. In another embodiment, the building management system 1220 may not be coupled to the control device 1242 and the NLEVT devices 1262, 1264, and 1266. Actions or functions provided by the building management system 1220 may be performed by the control device 1242, or a combination of the control device 1242 and the NLEVT devices 1262, 1264, and 1266. After reading this specification, skilled artisans will be able to determine a design for the components that is well suited for a particular application.

The non-light-emitting, variable transmission devices have been described with respect to voltages being applied to such devices. In another embodiment, a device may be controlled by applying a current, rather than applying a voltage. The concepts are described above can be extended to devices that are controlled by an applied current.

Embodiments as described herein allow for better control of non-light-emitting, variable transmission devices. Characterization data for a non-light-emitting, variable transmission device can be obtained during normal operation of such non-light-emitting, variable transmission device. The characterization data can include a characterization parameter that is updated as the non-light-emitting, variable transmission device is normally used. Thus, the control of the non-light-emitting, variable transmission device improves as it can reflect changes in the non-light-emitting, variable transmission device as it is used and ages.

In other embodiments, non-light-emitting, variable transmission devices can be operated in a manner that is better tailored to the non-light-emitting, variable transmission devices. Different non-light-emitting, variable transmission devices can operate differently, even if such non-light-emitting, variable transmission devices have the same nominal areal size, composition and thickness of layers, and are produced during the same production lot. No two non-light-emitting, variable transmission devices are perfectly identical, and therefore, do not have exactly the same visible transmittances when operated at the same operating parameter. Embodiments as described herein can allow operating parameters to be tailored to a subset or even non-light-emitting, variable transmission devices individually to account for differences between the non-light-emitting, variable transmission devices. Thus, more uniformity in visible transmittance between different non-light-emitting, variable transmission devices along a wall or skylight can now be realized. If different transmittances are desired, the methods as described herein can provide actual visible transmittances for different non-light-emitting, variable transmission devices that are closer to the desired visible transmittances when different desired visible transmittances are to be present.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An apparatus for operating a non-light-emitting, variable transmission device, the apparatus being configured to: operate the non-light-emitting, variable transmission device at a first operating parameter for a first time period, wherein the first operating parameter corresponds to a first intermediate visible transmittance; generate a characterization parameter based at least part on voltage and current measurements that are obtained during the first time period; and control the non-light-emitting, variable transmission device for a second time period based at least in part on the characterization parameter.

Embodiment 2. The apparatus of Embodiment 1, wherein the apparatus is further configured to measure an applied voltage and a current for the non-light-emitting, variable transmission device during the first time period.

Embodiment 3. The apparatus of Embodiment 1 or 2, wherein the apparatus is further configured to filter the characterization parameter before using the characterization parameter to control the non-light-emitting, variable transmission device.

Embodiment 4. The apparatus of any one of the preceding Embodiments, wherein the apparatus is further configured to store the characterization parameter after generating the characterization parameter.

Embodiment 5. The apparatus of any one of the preceding Embodiments, wherein the apparatus is further configured to change the non-light-emitting, variable transmission device from the intermediate visible transmittance to a different visible transmittance.

Embodiment 6. The apparatus of Embodiment 5, wherein the apparatus is further configured to determine a temperature of the non-light-emitting, variable transmission device using an impedance of the non-light-emitting, variable transmission device, wherein a voltage used to change the non-light-emitting, variable transmission device from the intermediate visible transmittance to a different visible transmittance is based at least in part on the temperature.

Embodiment 7. The apparatus of any one of the preceding Embodiments, wherein control of the non-light-emitting, variable transmission device comprises apply an overshoot voltage to the non-light-emitting, variable transmission device.

Embodiment 8. The apparatus of any one of the preceding Embodiments, wherein control the non-light-emitting, variable transmission device comprises compensate for hysteresis in the non-light-emitting, variable transmission device.

Embodiment 9. The apparatus of any one of the preceding Embodiments, wherein the apparatus is further configured to determine a visible transmittance of the non-light-emitting, variable transmission device using a charge that includes an ionic current integrated over time.

Embodiment 10. The apparatus of any one of the preceding Embodiments, wherein the apparatus is further configured to: update the characterization parameter based at least part on the voltage and current measurements that are obtained during the second time period; and control the non-light-emitting, variable transmission device for a third time period based at least in part on the updated characterization parameter.

Embodiment 11. The apparatus of any one of the preceding Embodiments, wherein the apparatus is further configured to obtain data corresponding to an ambient condition at least during the first time period; and adjusting the characterization parameter based at least in part on the data.

Embodiment 12. The apparatus of Embodiment 11, wherein the ambient condition includes a temperature, a humidity, a physical stress, an electrical stress, or any combination thereof; and the data corresponds to a time period of at least a week, a month, three months, or a year.

Embodiment 13. A method of operating a non-light-emitting, variable transmission device, the method comprising: operating the non-light-emitting, variable transmission device at a first operating parameter for a first time period, wherein the first operating parameter corresponds to an intermediate visible transmittance; generating a characterization parameter based at least part on the voltage and current measurements that are obtained during the first time period; and controlling the non-light-emitting, variable transmission device for a second time period based at least in part on the characterization parameter.

Embodiment 14. The method of Embodiment 13, further comprising measuring an applied voltage and a current for the non-light-emitting, variable transmission device during the first time period.

Embodiment 15. The method of Embodiment 13 or 14, further comprising filtering the characterization parameter before using the characterization parameter when controlling the non-light-emitting, variable transmission device.

Embodiment 16. The method of any one of Embodiments 13 to 15, further comprising storing the characterization parameter after generating the characterization parameter.

Embodiment 17. The method of any one of Embodiments 13 to 16, further comprising changing the non-light-emitting, variable transmission device from the intermediate visible transmittance to a different visible transmittance.

Embodiment 18. The method of Embodiment 17, wherein further comprising determining a temperature of the non-light-emitting, variable transmission device using an impedance of the non-light-emitting, variable transmission device, wherein a voltage used to change the non-light-emitting, variable transmission device from the intermediate visible transmittance to a different visible transmittance is based at least in part on the temperature.

Embodiment 19. The method of any one of Embodiments 13 to 18, wherein controlling the non-light-emitting, variable transmission device comprises applying an overshoot voltage to the non-light-emitting, variable transmission device.

Embodiment 20. The method of any one of Embodiments 13 to 19, wherein controlling the non-light-emitting, variable transmission device comprises compensating for hysteresis in the non-light-emitting, variable transmission device.

Embodiment 21. The method of any one of Embodiments 13 to 20, further comprising determining a visible transmittance of the non-light-emitting, variable transmission device using a charge that includes an ionic current integrated over time.

Embodiment 22. The method of any one of Embodiments 13 to 21, further comprising: updating the characterization parameter based at least part on voltage and current measurements that are obtained during the second time period; and controlling the non-light-emitting, variable transmission device for a third time period based at least in part on the characterization parameter after updating the characterization parameter.

Embodiment 23. The method of any one of Embodiments 13 to 22, further comprising obtaining data corresponding to an ambient condition at least during the first time period; and adjust the characterization parameter based at least in part on the data.

Embodiment 24. The method of Embodiment 23, wherein the ambient condition includes a temperature, a humidity, a physical stress, an electrical stress, or any combination thereof; and the data correspond to a time period of at least a week, a month, three months, or a year.

Embodiment 25. The apparatus or the method of any of the preceding Embodiments, wherein the characterization parameter is a leakage current parameter.

Embodiment 26. The apparatus or the method of Embodiment 25, wherein the leakage current parameter is a holding current divided by a product of an internal holding voltage of the non-light-emitting, variable transmission device times an area corresponding to the non-light-emitting, variable transmission device.

Embodiment 27. The apparatus or the method of Embodiment 26, wherein the internal holding voltage is an applied holding voltage minus a product of the holding current times a resistance corresponding to a wire, an electrical connector, a bus bar, or any combination thereof.

Embodiment 28. The apparatus or the method of Embodiment 26, wherein the area corresponding to the non-light-emitting, variable transmission device is an area of an insulated glass unit that includes the non-light-emitting, variable transmission device, an area of a glazing that includes the non-light-emitting, variable transmission device, or a tintable area of the non-light-emitting, variable transmission device.

Embodiment 29. The apparatus or the method of any one of the Embodiments 1 to 24, wherein the characterization parameter is an open circuit voltage.

Embodiment 30. The apparatus or the method of Embodiment 29, wherein the open circuit voltage is determined by measuring a voltage across terminals of the non-light-emitting, variable transmission device, wherein the non-light-emitting, variable transmission device is measured after disconnecting a power source from the non-light-emitting, variable transmission device at the intermediate visible transmittance.

Embodiment 31. The apparatus or the method of Embodiment 29, wherein the open circuit voltage is determined by: holding the non-light-emitting, variable transmission device at a different intermediate transmission state; calculating the open circuit voltage using holding voltages and holding currents and extrapolating a voltage when holding current is zero.

Embodiment 32. The apparatus or the method of any one of the Embodiments 1 to 24, wherein the characterization parameter is an intercalating charge parameter.

Embodiment 33. The apparatus or the method of any of the preceding Embodiments, wherein the first time period is at least at least 0.5 hour, at least 0.6 hour, or at least 0.8 hour.

Embodiment 34. The apparatus or the method of any one of the preceding Embodiments, wherein the first time period is at most 12 hours, at most 5 hours, or at most 2 hours.

Embodiment 35. The apparatus or the method of any one of the preceding Embodiments, wherein the intermediate visible transmittance is at least 1%, at least 2%, or at least 10% of a difference between a fully tinted visible transmittance and a fully bleached visible transmittance for the non-light-emitting, variable transmission device.

Embodiment 36. The apparatus or the method of any one of the preceding Embodiments, wherein the intermediate visible transmittance is at most 99%, at most 98%, or at most 90% of a difference between a fully tinted visible transmittance and a fully bleached visible transmittance for the non-light-emitting, variable transmission device.

Embodiment 37. An apparatus for operating a plurality of non-light-emitting, variable transmission devices including a first non-light-emitting, variable transmission device and a second non-light-emitting, variable transmission devices, the apparatus configured to: receive a first request for a first requested visible transmittance for the first non-light-emitting, variable transmission device; determine a first operating parameter for the first non-light-emitting, variable transmission device, wherein the first operating parameter is determined at least in part on first characterization data; operate the first operating parameter to the first non-light-emitting, variable transmission device; receive a second request for a second requested visible transmittance for the second non-light-emitting, variable transmission device; determine a second operating parameter for the second non-light-emitting, variable transmission device, wherein second operating parameter is determined at least in part on the second characterization data, and the second characterization data is different than the first characterization data; and operate the second operating parameter to the second non-light-emitting, variable transmission device, wherein the second operating parameter is different from the first operating parameter, wherein the apparatus is configured such that first and second non-light-emitting, variable transmission devices operate at the first and second operating parameters simultaneously for at least a point in time.

Embodiment 38. The apparatus of Embodiment 37, wherein the control device is further configured to retrieve the first characterization data; and retrieve the second characterization data.

Embodiment 39. The apparatus of Embodiment 37 or 38, wherein a percentage difference in the first and second requested visible transmittances is: difference$_{RT12}$=100%*(|TL$_{1R}$−TL$_{2R}$|)/TL$_{1R}$, wherein: difference$_{RT12}$ is the percentage difference in the first and second requested visible transmittances; TL$_{1R}$ is the first requested visible transmittance; TL$_{2R}$ is the second requested visible transmittance; and difference$_{RT12}$ is at most 3%, at most 2%, or at most 1%.

Embodiment 40. The apparatus of any one of Embodiments 37 to 39, wherein the first and second requested visible transmittances are a same visible transmittance.

Embodiment 41. The apparatus of any one of Embodiments 37 to 40, wherein: the first non-light-emitting, variable transmission device has a first actual visible transmittance corresponding to the first operating parameter; and the second non-light-emitting, variable transmission device has a second actual visible transmittance corresponding to the second operating parameter.

Embodiment 42. The apparatus of Embodiment 41, wherein a percentage difference in actual visible transmittances for the first and second non-light-emitting, variable transmission devices is: difference$_{AT12}$=100%*(|TL$_{1A}$−TL$_{2A}$|)/TL$_{1A}$, wherein: difference$_{AT12}$ is a percentage difference in the first and second actual visible transmittances; TL$_{1A}$ is the first actual visible transmittance; TL$_{2R}$ is the second actual visible transmittance; and difference$_{AT12}$ is at most 9%, at most 3%, or at most 1%.

Embodiment 43. The apparatus of Embodiment 42, wherein difference$_{AT}$ is at least 0.01%.

Embodiment 44. The apparatus of any one of Embodiments 37 to 43, wherein a first percentage deviation between the first requested and first actual visible transmittances is: deviation$_{RA1}$=100%*(|TL$_{1R}$−TL$_{1A}$|)/TL$_{1R}$, wherein: deviation$_{RA1}$ is the first percentage deviation between the first requested and first actual visible transmittances; TL$_{1R}$ is the first requested visible transmittance for the first non-light-emitting, variable transmission device; TL$_{1A}$ is the first actual visible transmittance for the first non-light-emitting, variable transmission device corresponding to the first operating parameter; and deviation$_{RA1}$ is at most 5%, at most 3%, or at most 1%.

Embodiment 45. The apparatus of Embodiment 44, wherein the deviation$_{RA1}$ is at least 0.01%.

Embodiment 46. The apparatus of any one of Embodiments 37 to 45, wherein a second percentage deviation between the second requested and second actual visible transmittances is: deviation$_{RA2}$=100%*(|TL$_{2R}$−TL$_{2A}$|)/TL$_{2R}$, wherein: deviation$_{RA2}$ is the second percentage deviation between the second requested and second actual visible transmittances; TL$_{2R}$ is the second requested visible transmittance for the second non-light-emitting, variable transmission device; TL$_{2R}$ is the second actual visible transmittance for the second non-light-emitting, variable transmission device corresponding to the second operating parameter; and deviation$_{RA2}$ is at most 5%, at most 3%, or at most 1%.

Embodiment 47. The apparatus of Embodiment 46, wherein the deviation$_{RA2}$ is at least 0.01%.

Embodiment 48. A method of operating a plurality of non-light-emitting, variable transmission devices including a first non-light-emitting, variable transmission device and a second non-light-emitting, variable transmission device, the method comprising: receiving a first request for a first requested visible transmittance for the first non-light-emitting, variable transmission device; determining a first operating parameter for the first non-light-emitting, variable transmission device, wherein the first operating parameter is determined at least in part on first characterization data for the first non-light-emitting, variable transmission device; operating the first non-light-emitting, variable transmission device at the first operating parameter; receiving a second request for a second requested visible transmittance for the second non-light-emitting, variable transmission device; determining a second operating parameter for the second non-light-emitting, variable transmission device, wherein the second operating parameter is determined at least in part on second characterization data for the second non-light-emitting, variable transmission device, wherein the second characterization data is different from than the first characterization data; and operating the second non-light-emitting, variable transmission device at the second operating parameter, wherein the operating the first non-light-emitting, variable transmission device at the first operating parameter and operating the second non-light-emitting, variable transmission device at the second operating parameter occur simultaneously for at least a point in time.

Embodiment 49. The method of Embodiment 48, further comprising retrieving the first characterization data; and retrieving the second characterization data.

Embodiment 50. The method of Embodiment 48 or 49, wherein receiving the first request for the first requested visible transmittance, and receiving the second request for the second requested visible transmittance are performed such that a percentage difference in the first and second requested visible transmittances is: difference$_{RT12}$=100%*(|TL$_{1R}$−TL$_{2R}$|)/TL$_{1R}$, wherein: difference$_{RT12}$ is the percentage difference in the first and second requested visible transmittances; TL$_{1R}$ is the first requested visible transmittance; TL$_{2R}$ is the second requested visible transmittance; and difference$_{RT12}$ is at most 5%, at most 2%, or at most 1%.

Embodiment 51. The method of Embodiment 50, wherein receiving the first request for the first requested visible transmittance, and receiving the second request for the second requested visible transmittance are performed such that the first and second requested visible transmittances are a same visible transmittance.

Embodiment 52. The method of any one of Embodiments 48 to 51, wherein: operating the first non-light-emitting, variable transmission device is performed such that the first non-light-emitting, variable transmission device has a first actual visible transmittance corresponding to the first operating parameter; and operating the second non-light-emitting, variable transmission device is performed such that the second non-light-emitting, variable transmission device has a second actual visible transmittance corresponding to the second operating parameter.

Embodiment 53. The method of Embodiment 52, wherein operating the first non-light-emitting, variable transmission device at the first operating parameter, and operating the second non-light-emitting, variable transmission device at the second operating parameter are performed such that a percentage difference in the first and second actual visible transmittances is: difference$_{AT12}$=100%*(|TL$_{1A}$−TL$_{2A}$|)/TL$_{1A}$, wherein: difference$_{AT12}$ is the percentage difference in first and second actual visible transmittances; TL$_{1A}$ is the first actual visible transmittance; TL$_{2A}$ is the second actual visible transmittance; and difference$_{AT12}$ is at most 3%, at most 2%, or at most 1%.

Embodiment 54. The method of Embodiment 53, wherein operating the first non-light-emitting, variable transmission device at the first operating parameter, and operating the second non-light-emitting, variable transmission device at the second operating parameter is performed such difference$_{AT}$ is at least 0.01%.

Embodiment 55. The method of any one of Embodiments 48 to 54, wherein receiving the first request for the first requested visible transmittance for the first non-light-emitting, variable transmission device, and operating the first non-light-emitting, variable transmission device at the first operating parameter are performed such that a first percentage deviation between the first requested and first actual visible transmittances is: deviation$_{RA1}$=100%*(|TL$_{1R}$−TL$_{1A}$|)/TL$_{1R}$, wherein: deviation$_{RA1}$ is the percentage deviation between the first requested and first actual visible transmittances; TL$_{1R}$ is the first requested visible transmittance for the first non-light-emitting, variable transmission device; TL$_{1A}$ is the first actual visible transmittance for the first non-light-emitting, variable transmission device corresponding to the first operating parameter; and deviation$_{RA1}$ is at most 5%, at most 3%, or at most 1%.

Embodiment 56. The method of Embodiment 55, wherein receiving the first request for a first requested visible transmittance for the first non-light-emitting, variable transmission device, and operating the first non-light-emitting, variable transmission device at the first operating parameter is performed such that the deviation$_{RA1}$ is at least 0.01%.

Embodiment 57. The method of any one of Embodiments 48 to 56, wherein receiving the second request for the second requested visible transmittance for the second non-light-emitting, variable transmission device, and operating the second non-light-emitting, variable transmission device at the second operating parameter are performed such that a second percentage deviation between the second requested and second actual visible transmittances is: deviation$_{RA2}$=100%*(|TL$_{2R}$−TL$_{2A}$|)/TL$_{2R}$, wherein: deviation$_{RA2}$ is the second percentage deviation between the second requested and second actual visible transmittances; TL$_{2R}$ is the second requested visible transmittance for the second non-light-emitting, variable transmission device; TL$_{2A}$ is the second actual visible transmittance for the second non-light-emitting, variable transmission device corresponding to the second operating parameter; and deviation$_{RA2}$ is at most 5%, at most 3%, or at most 1%.

Embodiment 58. The method of Embodiment 57, wherein receiving the second request for the second requested visible transmittance for the second non-light-emitting, variable transmission device, and operating the second non-light-emitting, variable transmission device at the second operating parameter are performed such that the deviation$_{RA2}$ is at least 0.01%.

Embodiment 59. The apparatus or the method of any one of Embodiments 37 to 58, wherein each of the first and second characterization data includes voltages and corresponding visible transmittances.

Embodiment 60. The apparatus or the method of any one of Embodiments 37 to 59, wherein each of the first and second characterization data includes temperatures and either or both of corresponding voltages and corresponding visible transmittances.

Embodiment 61. The apparatus or the method of any one of Embodiments 37 to 60, wherein a building comprises a wall and the plurality of non-light-emitting, variable transmission devices, including the first and second non-light-emitting, variable transmission devices, are disposed along the wall of the building.

Embodiment 62. The apparatus or the method of any one of Embodiments 37 to 60, wherein a building comprises a room having a wall and the plurality of non-light-emitting, variable transmission devices, including the first and second non-light-emitting, variable transmission devices, are disposed along the wall within the room.

Embodiment 63. The apparatus or the method of any one of Embodiments 37 to 60, wherein a building comprises a skylight and the plurality of non-light-emitting, variable transmission devices, including the first and second non-light-emitting, variable transmission devices, are parts of the skylight.

Embodiment 64. The apparatus or the method of any one of Embodiments 37 to 63, wherein the first and second non-light-emitting, variable transmission devices are disposed along a glass substrate.

Embodiment 65. The apparatus or the method of any one of Embodiments 37 to 64, wherein when the first and second non-light-emitting, variable transmission devices are operating at the first and second operating parameters, no visible difference in transmission can be detected by a human having average eyesight.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus for operating a non-light-emitting, variable transmission device, the apparatus comprising a processor that executes instructions to:
    operate the non-light-emitting, variable transmission device at a first operating parameter for a first time period, wherein the first operating parameter corresponds to a first intermediate visible transmittance where a steady state for ion migration occurs during the first time period;
    generate a characterization parameter based at least part on voltage and current measurements that are obtained during the first time period, wherein generating a characterization parameter corresponds to a leakage current and comprises plotting the intermediate visible transmittance as a function of an internal voltage, and plotting an open circuit voltage;
    filter the characterization parameter, wherein filtering reduces or eliminates an outlier value; and
    control the non-light-emitting, variable transmission device for a second time period based at least in part on the filtered characterization parameter.

2. The apparatus of claim 1, wherein the apparatus is further configured to:
    measure an applied voltage and a current for the non-light-emitting, variable transmission device during the first time period.

3. The apparatus of claim 1, wherein the apparatus is further configured to:
    filter the characterization parameter before using the characterization parameter to control the non-light-emitting, variable transmission device.

4. The apparatus of claim 1, wherein the apparatus is further configured to:
    store the characterization parameter after generating the characterization parameter.

5. The apparatus of claim 1, wherein the apparatus is further configured to:
    change the non-light-emitting, variable transmission device from the intermediate visible transmittance to a different visible transmittance.

6. The apparatus of claim 5, wherein the apparatus is further configured to:
    determine a temperature of the non-light-emitting, variable transmission device using an impedance of the non-light-emitting, variable transmission device,
    wherein a voltage used to change the non-light-emitting, variable transmission device from the intermediate visible transmittance to a different visible transmittance is based at least in part on the temperature.

7. The apparatus of claim 1, wherein control of the non-light-emitting, variable transmission device comprises apply an overshoot voltage to the non-light-emitting, variable transmission device.

8. The apparatus of claim 1, wherein control the non-light-emitting, variable transmission device comprises compensate for hysteresis in the non-light-emitting, variable transmission device.

9. The apparatus of claim 1, wherein the apparatus is further configured to:
    determine a visible transmittance of the non-light-emitting, variable transmission device using a charge that includes an ionic current integrated over time;
    update the characterization parameter based at least part on the voltage and current measurements that are obtained during the second time period;
    control the non-light-emitting, variable transmission device for a third time period based at least in part on the updated characterization parameter;
    obtain data corresponding to an ambient condition at least during the first time period; and
    adjusting the characterization parameter based at least in part on the data.

10. The apparatus of claim 9, wherein:
    the ambient condition includes a temperature, a humidity, a physical stress, an electrical stress, or any combination thereof; and
    the data corresponds to a time period of at least a week, a month, three months, or a year.

11. A method of operating a non-light-emitting, variable transmission device, the method comprising:
    operating the non-light-emitting, variable transmission device at a first operating parameter for a first time period, wherein the first operating parameter corresponds to an intermediate visible transmittance, where a steady state for ion migration occurs during the first time period;
    generating a characterization parameter corresponding to a leakage current and based at least part on the voltage and current measurements that are obtained during the first time period, wherein generating a characterization parameter comprises plotting the intermediate visible transmittance as a function of an internal voltage, and plotting an open circuit voltage;
    filtering the characterization parameter, wherein filtering reduces or eliminates an outlier value; and
    controlling the non-light-emitting, variable transmission device for a second time period based at least in part on the characterization parameter.

12. The method of claim 11, further comprising:
    measuring an applied voltage and a current for the non-light-emitting, variable transmission device during the first time period.

13. The method of claim 11, further comprising:
    filtering the characterization parameter before using the characterization parameter when controlling the non-light-emitting, variable transmission device.

14. The method of claim 11, further comprising:
    storing the characterization parameter after generating the characterization parameter; and
    changing the non-light-emitting, variable transmission device from the intermediate visible transmittance to a different visible transmittance.

15. The method of claim 14, wherein further comprising:
    determining a temperature of the non-light-emitting, variable transmission device using an impedance of the non-light-emitting, variable transmission device,
    wherein a voltage used to change the non-light-emitting, variable transmission device from the intermediate visible transmittance to a different visible transmittance is based at least in part on the temperature.

16. The method of claim 11, wherein controlling the non-light-emitting, variable transmission device comprises applying an overshoot voltage to the non-light-emitting, variable transmission device.

17. The method of claim 11, wherein controlling the non-light-emitting, variable transmission device comprises compensating for hysteresis in the non-light-emitting, variable transmission device.

18. The method of claim 11, further comprising:
- determining a visible transmittance of the non-light-emitting, variable transmission device using a charge that includes an ionic current integrated over time;
- updating the characterization parameter based at least part on voltage and current measurements that are obtained during the second time period;
- controlling the non-light-emitting, variable transmission device for a third time period based at least in part on the characterization parameter after updating the characterization parameter
- obtaining data corresponding to an ambient condition at least during the first time period; and
- adjust the characterization parameter based at least in part on the data.

\* \* \* \* \*